(12) United States Patent
Erdogan et al.

(10) Patent No.: US 7,773,302 B2
(45) Date of Patent: Aug. 10, 2010

(54) LOW COST FILTER FOR FLUORESCENCE SYSTEMS

(75) Inventors: Turan Erdogan, Spenceport, NY (US); Joseph T. Foss, Rochester, NY (US); Victor Mizrahi, Annapolis, MD (US); Atul Pradhan, Pittsford, NY (US); Ligang Wang, Rochester, NY (US)

(73) Assignee: Semrock, Inc., Rochester, NY (US)

( * ) Notice: Subject to any disclaimer, the term of this patent is extended or adjusted under 35 U.S.C. 154(b) by 517 days.

(21) Appl. No.: 11/896,589

(22) Filed: Sep. 4, 2007

(65) Prior Publication Data

US 2008/0055716 A1 Mar. 6, 2008

Related U.S. Application Data

(60) Provisional application No. 60/841,552, filed on Sep. 1, 2006, provisional application No. 60/842,950, filed on Sep. 8, 2006.

(51) Int. Cl.
*G02B 5/28* (2006.01)

(52) U.S. Cl. ........................ 359/589; 359/359

(58) Field of Classification Search ................ 359/359, 359/360, 580, 589
See application file for complete search history.

(56) References Cited

U.S. PATENT DOCUMENTS

| | | | |
|---|---|---|---|
| 6,018,421 A * | 1/2000 | Cushing | 359/589 |
| 6,110,337 A | 8/2000 | Sullivan et al. | |
| 6,157,490 A * | 12/2000 | Wheatley et al. | 359/589 |
| 6,217,720 B1 | 4/2001 | Sullivan et al. | |
| 6,809,859 B2 | 10/2004 | Erdogan et al. | |
| 7,068,430 B1 | 6/2006 | Clarke et al. | |
| 7,119,960 B1 | 10/2006 | Erdogan et al. | |
| 7,123,416 B1 | 10/2006 | Erdogan et al. | |
| 2005/0110999 A1 | 5/2005 | Erdogan et al. | |
| 2009/0321865 A1* | 12/2009 | Kasano et al. | 257/432 |

OTHER PUBLICATIONS

N.A. O'Brien et al., *Recent Advances in Thin Film Interference Filters for Telecommunications*, 2001 Society of Vacuum Coaters, 44th Annual Technical Conference Proceedings—Philadelphia, Apr. 21-26, 2001, ISSN 0737-5921, pp. 255-261.

R. B. Sargent et al., *Review of Thin Films in Telecommunications Applications*, Thin Film Products Group, JDS Uniphase, Santa Rose, California, pp. WA2-1 thru WA2-3.

* cited by examiner

*Primary Examiner*—Frank G Font
(74) *Attorney, Agent, or Firm*—Finnegan, Henderson, Farabow, Garrent & Dunner LLP

(57) ABSTRACT

Consistent with the present disclosure, a filter is provided by depositing a coating a substrate. The coating, which may include a plurality of hard-coating layers, has an associated transmission characteristic having a passband, as well as extended blocking.

24 Claims, 19 Drawing Sheets

LOW COST FILTER FOR FLUORESCENCE SYSTEMS

This application claims the benefit of U.S. Provisional Application No. 60/841,552 filed Sep. 1, 2006, and U.S. Provisional Application No. 60/842,950 filed Sep. 8, 2006, the contents of both of which are incorporated herein by reference.

The present disclosure is directed toward optical filters. In particular, the present disclosure relates to optical filters which may be incorporated into fluorescence imaging and/or quantification systems.

Fluorescence systems are often employed to analyze or image biological samples. In such systems, the sample is typically exposed to light from a broadband or laser source at a wavelength at which a material of interest in the sample, such as a fluorophore or a naturally occurring substance in the material, absorbs light causing it to fluoresce or emit light at a different (typically longer) wavelength. Light emitted from the sample is then detected so that the location, amount, and other properties associated with the material of interest, as well as the sample, can be determined. In addition, an image of the sample can be constructed based on the detected fluorophore, for example.

In many fluorescence systems, light at a given wavelength excites an atom in the material of interest. The atom then relaxes to a lower energy state, and, in doing so, emits light at a different wavelength. Fluorescence systems typically include an optical source, such as a bright arc lamp or a laser, to generate the excitation light, and a photodetector for sensing light emitted by the sample. The photodetector may include a digital camera or the eyes of an observer. In order to reduce the amount of other light reaching detector, such as light from the source, filters are typically employed which are transmissive at wavelengths of light emitted by the sample, but reflective and/or absorbing at other wavelengths. If light at such other wavelengths is adequately suppressed, a so called "spectral darkfield" situation can be achieved in which an image is black or dark when no features of interest are present. Image quality can thus be improved. Without this spectral darkfield property, in most samples no fluorescence could be observed.

Optical filters are also used to direct the excitation light to the sample, and if highly reflective or absorbing at wavelengths associated with the emitted light, can efficiently direct the excitation light at the desired wavelengths to the sample while blocking light from the source at the emitted wavelengths.

Some optical filters include coatings of metal oxides and are physically hard ("hard coatings"), while others include coatings of softer materials, such as sodium aluminum fluoride ("cryolite") and/or zinc sulfide ("soft coatings"). Filters including soft coatings are commercially available from Omega Optical, Inc.

With improved optical filters, more photons of emitted light and fewer photons of undesired light (e.g., the excitation light) are fed to the photodetector. Thus, weaker signals can be detected, or less excitation light is required to generate a given emitted optical signal, thereby minimizing damage to the sample by intense light from the source. Or, an image can be detected in less time leading to faster measurements. In addition, a higher signal-to-noise ratio (and therefore better resolution) can be achieved in the image, since, for example, the filter can block more excitation light from reaching the photodetector, while transmitting a given intensity of emitted light.

For an optical filter to be useful as a fluorescence filter, it preferably should be able to transmit light with high efficiency over a well-defined band of wavelengths (passband). The spectrum associated with an optical passband filter typically has reduced transmission over a limited range of wavelengths above the high wavelength edge of the passband, as well as a limited range of wavelengths below the lowest wavelength edge. For fluorescence spectroscopy applications, however, the filter spectrum should have substantial blocking of light over a broad range of wavelengths extending well beyond the limited ranges associated with the passband. Generally these two requirements (high transmission in the passband and extended blocking) are at least somewhat mutually exclusive. That is, providing more blocking generally occurs at the expense of reduced transmission in the desired passband. As explained below, wide-band blocking or extended blocking can be enhanced by colored (or absorbing) filter glass. Even with such enhancements, however, typically the most effective means to provide high blocking is with dielectric thin-film reflecting layers—generally the more layers, the more blocking is achievable. Because there tend to be limitations on the number of layers that can be successfully deposited in a single coating run, this requirement means that conventional fluorescence filters to-date have typically required multiple thin-film coatings per filter. For example, filters fabricated by ion-beam sputtering, which deposit many hard coating layers have to-date been made with at least two coatings per filter. Such filters include BrightLine® fluorescence filters commercially available from Semrock, Inc. Filters are disclosed in U.S. Pat. Nos. 6,809,859, 7,068,430, 7,119,960, and 7,123,416, as well as application Ser. No. 10/953,483, all of which are incorporated herein by reference.

As noted above, colored filter glass has been implemented in order to obtain greater blocking over a wider spectrum. Typically, colored filter glass is often combined with filters formed of soft-coated layers (discussed in U.S. Pat. No. 6,809,859) for such purposes. For example, the long-wave pass emission filters of very low-cost fluorescence filter sets are comprised of a single piece of colored filter glass.

In most soft-coated filters, however, extended-blocking multiple optical coatings are typically provided, each of which blocks light over a band of wavelengths determined by the "stopband width" of a characteristic quarter-wave stack of thin-film layers. Thus, wider blocking ranges require more quarter-wave stack coatings and are thus more difficult to fabricate.

Hard-coated filters are more robust than soft-coated filters and usually achieve blocking via dielectric reflection. Some hard-coated filters are based on a long-wave-pass coating on one side of a single substrate and a short-wave-pass coating on the opposite side, thus producing a bandpass filter, where one or both of the coatings also has built-in extended blocking reflection layers. Other conventional hard-coated filters have been made that have a bandpass filter on one side of a substrate based on a multi-cavity Fabry-Perot type filter coating (quarter-wave-based structure), and then one or more additional coatings with extended blocking layers on the opposite side of the substrate and any additional needed substrates (when there is more than one additional coating). Such filters are described in U.S. Pat. No. 7,119,960 and typically have a narrow passband, which, when measured at the optical density 5 points on the spectral curve, is less than 2% of the center wavelength of the passband. It would be desirable, however, to provide a filter with a wider passband.

Conventional filters typically have limited performance due to the high losses and poor edge steepness associated with colored filter glass or require multiple coating runs leading to higher filter cost. Furthermore, conventional filters that are able to be made at reasonable costs (targeted at more cost-conscious markets like clinical microscopy) typically suffer from poor brightness, poor contrast, and poor reliability and durability. The lower brightness results from the use of colored filter glass in some instances, or from thinner and fewer coatings to reduce coating time, which lead to less steep filter edges (and thus wider exciter-emitter passband separation). Poorer contrast also results from the inability to position the edges optimally (due to poor steepness) as well as lower overall blocking when the coating thickness and the number of coatings are limited. Poor reliability and durability results from the use of soft coatings, which until now have been the only means by which low-cost fluorescence filters could be produced. These filters tend to "burn-out" when exposed to intense radiation for extended periods of time, and because the coatings are porous and absorb water vapor, they can degrade over time, especially in hot, humid, and corrosive environments. In addition, coatings that are not protected from physical contact by an extra glass substrate (such as those found on dichroic beamsplitters) are susceptible to damage when handled or when normal optics cleaning procedures are used.

Accordingly, there is a need for optical fluorescence filters having reduced cost for clinical microscopy applications, for example. There is also a need for such low cost filters to provide more brightness, a lower background light level and/or better contrast. In addition, there is a need for filters that have extremely high reliability and durability, especially in clinical applications, in which doctors and medical technicians must make repeated diagnoses of identical tissue samples, for example, even years after the samples are taken.

SUMMARY OF THE INVENTION

Consistent with an aspect of the present disclosure, an optical device is provided which comprises a substrate having a surface and a plurality of hard-coating layers provided on the surface of the substrate. The plurality of hard-coating layers includes alternating first and second layers. The first layers have a first refractive index, $n_L$, and the second layers having a second refractive index, $n_H$, greater than the first refractive index. In addition, the plurality of hard-coating layers has a spectral characteristic, which has a passband. The passband is defined by a first passband wavelength $\lambda_{1passband}$ and a second passband wavelength $\lambda_{2passband}$. The passband has a center wavelength and the minimum spectral distance between the optical density 4 points on the spectral curve is greater than 2% of the center wavelength. The spectral characteristic also has an average transmissivity at least equal to 80% over the passband. Further, the spectral characteristic has an average optical density greater than 4 over a first blocking band of wavelengths extending from a first blocking wavelength, $\lambda_{1block}$, to a second blocking wavelength, $\lambda_{2block}$, whereby the second blocking wavelength satisfies:

$$\lambda_{2block} < 0.9*((1-x)/(1+x))*\lambda_{1block},$$

Alternatively, the spectral characteristic has an average optical density greater than 4 over a second blocking band of wavelengths extending from a third blocking wavelength $\lambda_{3block}$ to a fourth blocking wavelength, $\lambda_{4block}$, the fourth blocking wavelength satisfies:

$$\lambda_{4block} > 1.1*((1+x)/(1-x))*\lambda_{3block},$$

where $$x = \frac{2}{\pi}\arcsin\left(\frac{n_H - n_L}{n_H + n_L}\right).$$

A first edge band of wavelengths is associated with a first edge portion of the spectral characteristic adjacent the passband. The first edge band of wavelengths extends from $\lambda_{1passband}$ to $\lambda_{1block}$, such that, at a first transmission wavelength, $\lambda_{1-50\%}$, within the first edge band of wavelengths, the coating has a transmissivity of 50%.

$\lambda_{1passband}$, $\lambda_{1block}$, and $\lambda_{1-50\%}$, satisfy:

$$(\lambda_{1passband} - \lambda_{1block})/\lambda_{1-50\%} < 2\%, \text{ and}$$

A second edge band of wavelengths is associated with a second edge portion of the spectral characteristic adjacent the passband. The second edge band of wavelengths extends from $\lambda_{2passband}$ to $\lambda_{3block}$, such that, at a second transmission wavelength, $\lambda_{2-50\%}$, within the second edge band of wavelengths, the coating has a transmissivity of 50%, $\lambda_{2passband}$, $\lambda_{3block}$, and $\lambda_{2-50\%}$, satisfy:

$$(\lambda_{3block} - \lambda_{2passband})/\lambda_{2-50\%} < 2\%.$$

BRIEF DESCRIPTION OF THE DRAWINGS

The accompanying drawings, which are incorporated in and constitute a part of this specification, illustrate several embodiments of the invention and together with the description, serve to explain the principles of the invention.

DETAILED DESCRIPTION OF THE PREFERRED EMBODIMENTS

Consistent with the present disclosure, a filter having high transmission, steep edges, and extended blocking is realized with a single coating provided on one side of a substrate. Instead of providing a plurality of quarter-wavelength-based Fabry-Perot type cavities, the single coating includes a portion that serves as a first edge filter for blocking wavelengths exceeding some predetermined wavelength, and another portion that acts as a second edge filter to block wavelengths below another wavelength. When these coating portions are formed on one another, their corresponding spectra are superimposed, and the resulting spectrum includes a wide passband (greater than 2% the center wavelength, measured as the minimum spectral distance between the optical density 4 points on the spectral curve) with blocking on either side. The coating also includes at least one additional portion for extended blocking. As a result, a filter having a spectrum with high transmissivity in the passband, steep passband edges, and extended blocking can be obtained in a single coating without the need to provide additional coatings on multiple substrates. Accordingly, multiple conventional filters are not necessary to obtain these desirable spectral characteristics. Overall costs are therefore reduced. In addition, a filter set (including an exciter filter, beam splitter and emission filter) having just three filter components can be realized, leading to a simpler system design with improved reliability.

Reference will now be made in detail to various exemplary embodiments of the present disclosure, examples of which are illustrated in the accompanying drawings. Wherever possible, the same reference numbers will be used throughout the drawings to refer to the same or like parts.

Figure 1:
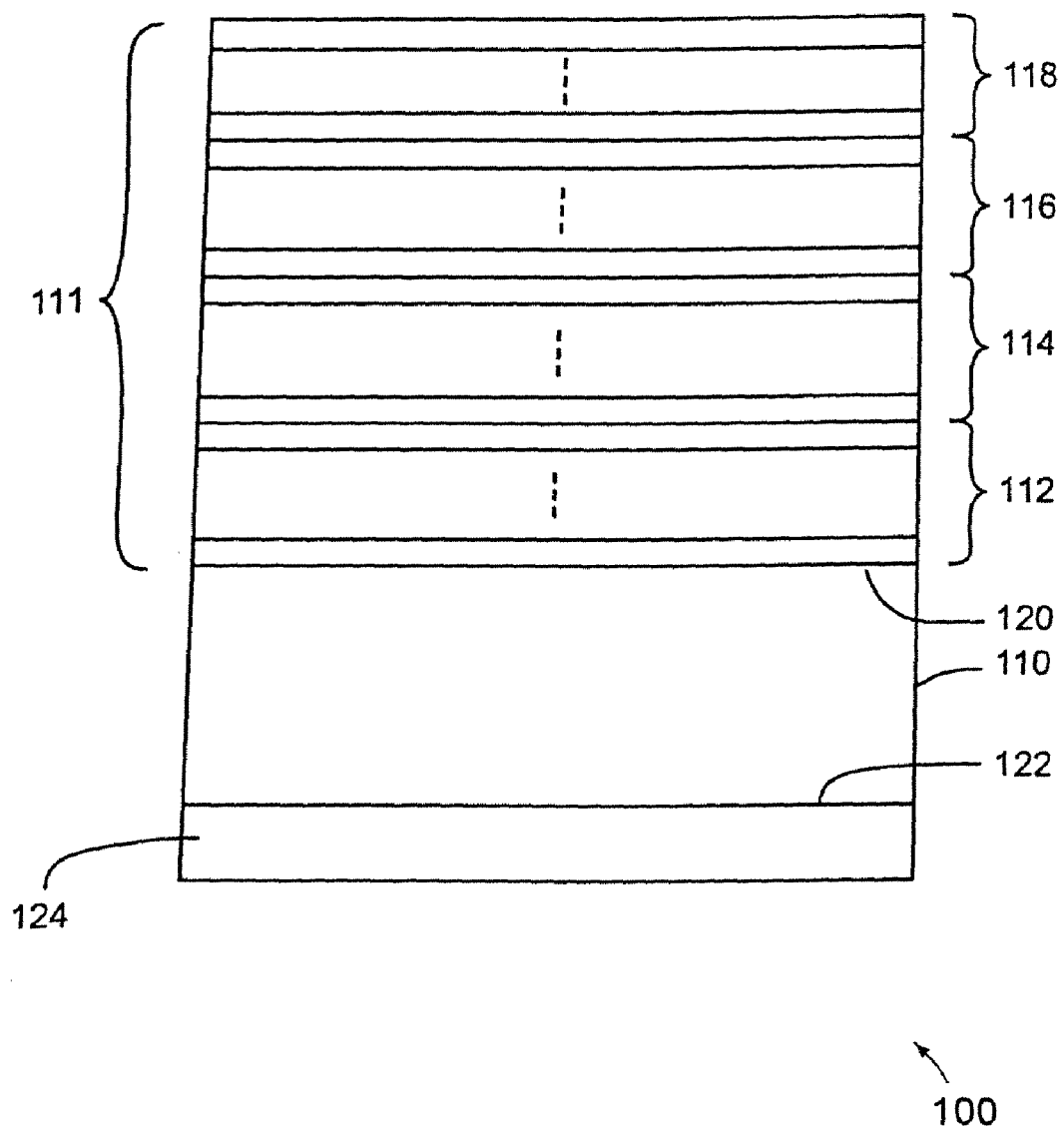
FIG. 1 illustrates a cross-sectional view of a filter consistent with an aspect of the present disclosure.

An exemplary filter 100 in accordance with the present disclosure is shown in FIG. 1. Filter 100 includes a plurality of layers of alternating high ($n_H$) and low ($n_L$) refractive index, which constitute a coating 111 having a plurality of alternating refractive index hard coating layers on a first surface 120 of substrate 110. Typically, coating 111 includes hard coating layers, although soft coatings may also be employed. Substrate 110 typically includes a float glass or an optical glass. The low refractive index layers, if made of hard materials, typically include one of $SiO_2$, $Ta_2O_5$, $Nb_2O_5$, $HfO_2$, $TiO_2$, and $Al_2O_5$., while the high refractive index layers, if made of hard materials, include another one of $SiO_2$, $Ta_2O_5$, $Nb_2O_5$, $HfO_2$, $TiO_2$, and $Al_2O_5$ (each of the materials that either the high or low refractive index layers is physically hard and thus forms a "hard coating" layer). Coating 111 includes a first coating portion 112 having some of the alternating layers of high and low refractive index materials, which are configured to transmit shorter wavelengths and provide extended blocking at long wavelengths. A second coating portion 114, typically including those materials of first portion 112, is provided on first coating portion 112. Second portion 114 is configured to act as an edge filter to pass shorter wavelengths, and thus may be termed a "short-wave-pass layer." A third coating portion 116, including other hard-coating layers, is next provided on second coating portion 114. Third coating portion 116 is configured as an edge filter to have high transmissivity at longer wavelengths and provide blocking over a limited range of shorter wavelengths. Third coating portion 116 may thus be termed a "long-wave-pass" layer. Fourth coating portion 118, also including hard-coating layers, may further be deposited on third coating portion 116. Fourth coating portion 118 is configured to provide extended blocking at shorter wavelengths. Third coating portion 116 and fourth coating portion 118 typically include those materials forming the alternating layers of first and second coating portions 112 and 114, respectively.

The first (112), second, (114), third (116), and fourth (118) coating portions are typically formed with high-precision, ion-assisted, ion-beam sputtering thin-film deposition techniques. Such known techniques, which may include optical monitoring, can be used to accurately deposit hundreds of layers. In particular, deposition of the first (112) and second (114) coating portions may be controlled in accordance with known algorithms and may be further controlled with known optical monitoring of the deposited materials. Deposition of the third (116) and fourth (118) coating portions may also be controlled with known algorithms. Optical monitoring of the deposition of the materials that constitute the third (116) and fourth (118) coating portions, however, may not be necessary. Rather, these depositions may be timed for specified periods of time instead of being subject to continuous optical monitoring. Known optimization algorithms may also be applied to further adjust the overall thickness of each of coating portions 112, 114, 116, and 118 and/or the thicknesses of individual high and low refractive index layers that constitute coating portions 112, 114, 116, and 118. In addition, consistent with the present disclosure, first coating portion 112 may be omitted if extended blocking (described in greater detail below) at longer wavelengths is not required. In that case, coating 111 includes coating portions 114, 116, and 118. Alternatively, if extended blocking at shorter wavelengths is not required, fourth coating portion 118 may be omitted, such that coating 111 includes coating portions 112, 114, and 116.

Figure 2A:
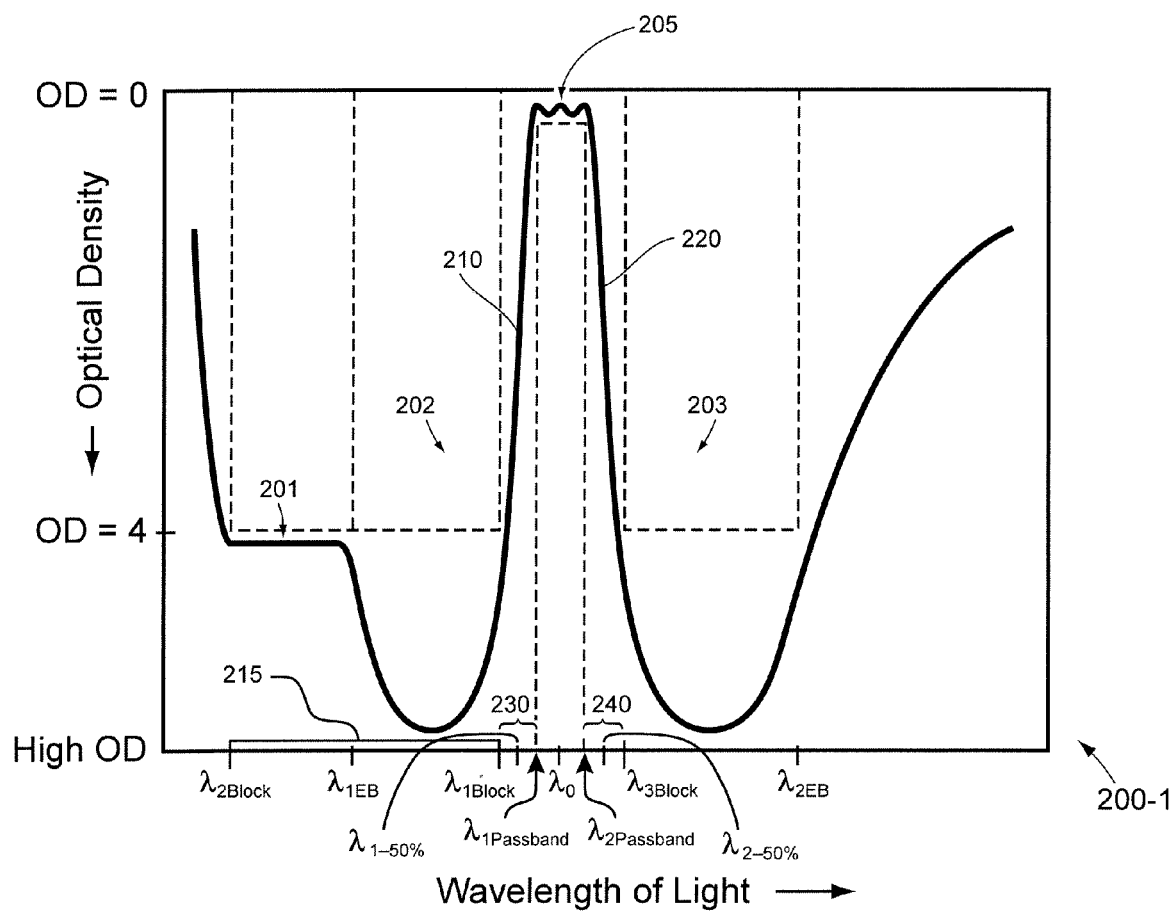
FIGS. 2a-2c illustrate spectral characteristics associated with examples of the filter shown in FIG. 1.
Figure 2B:
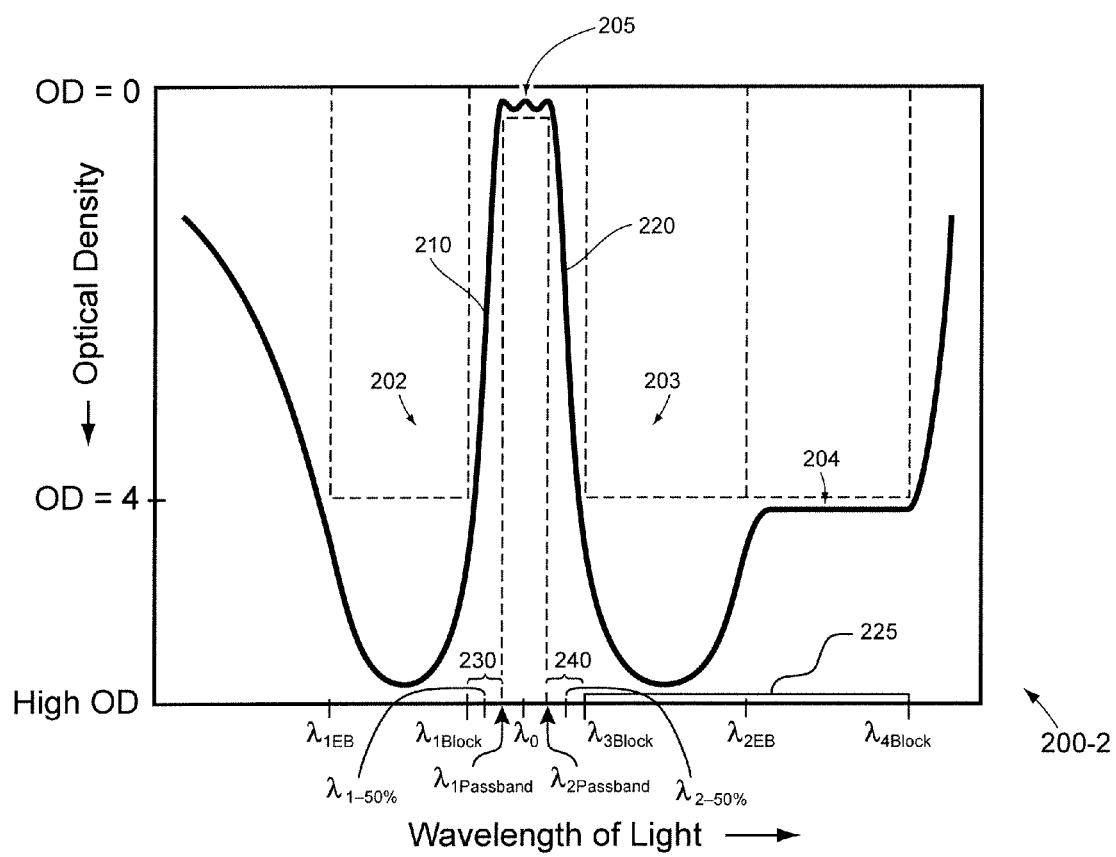
Figure 2C:
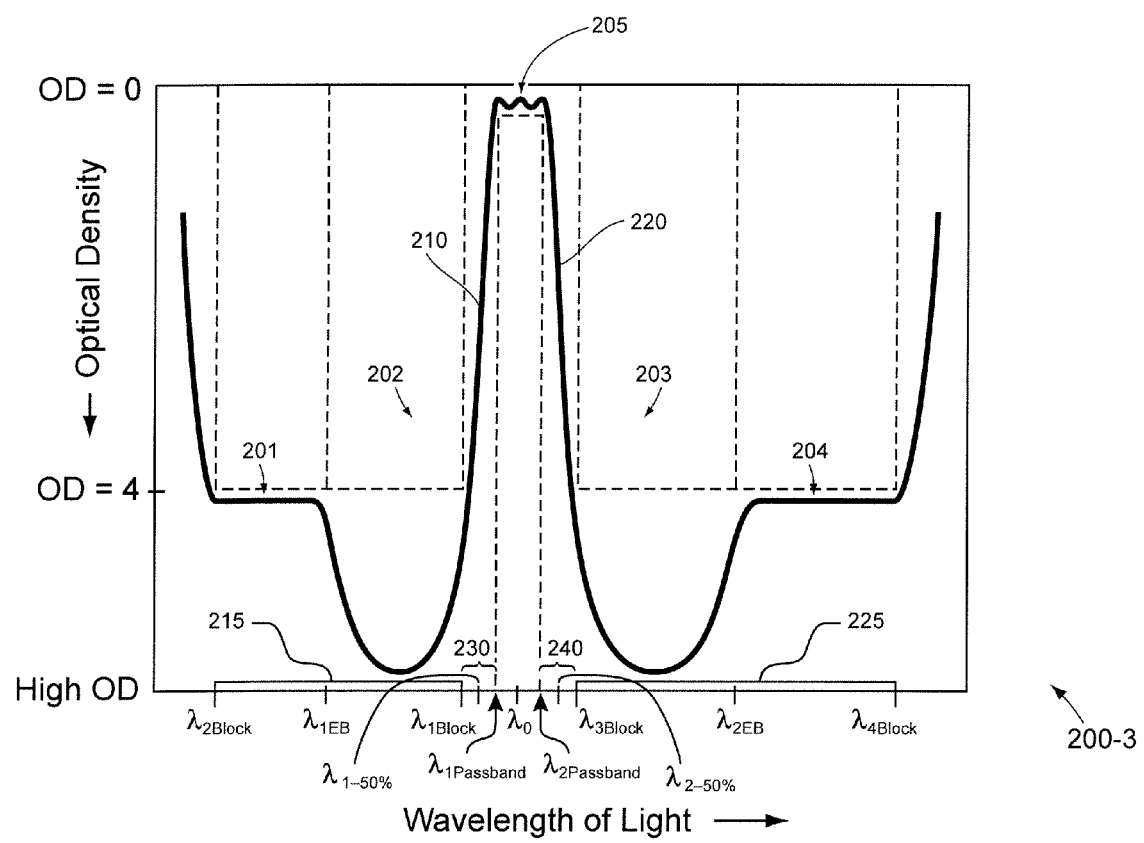

An exemplary spectral characteristic 200-3 of filter 100 consistent with the present disclosure is shown in FIG. 2c. The spectral characteristic has a passband 205, which is defined by a first passband wavelength $\lambda_{1passband}$ and a second passband wavelength $\lambda_{2passband}$. Spectral characteristic 200-3 has an average transmissivity at least equal to 80% over passband 205 and an average optical density greater than 4, and may be more than 5, over first blocking band of wavelengths 215 extending from a first blocking wavelength, $\lambda_{1block}$, to a second blocking wavelength, $\lambda_{2block}$. As shown in FIG. 2c, $\lambda_{1block}$ is less than $\lambda_{1passband}$. Here, "optical density" (OD) is defined as OD=$-\log_{10}(T)$, T being an average transmission measured between 0 and 1, and "average optical density" is defined as the optical density where T is the transmission averaged over a band of wavelengths,. Preferably, the second blocking wavelength satisfies:

$$\lambda_{2block} < 0.9*((1-x)/(1+x))*\lambda_{1block},$$

where $$x = \frac{2}{\pi}\arcsin\left(\frac{n_H - n_L}{n_H + n_L}\right).$$

A value for $\lambda_{2block}$ as determined by the above equations typically indicates that the blocking on the short-wavelength side of the passband occurs over a wider region than that which would result from a single quarter-wave stack of layers. The equations are adapted from the analysis in Section 5.2 (specifically Equations 5.15) from the text book *Thin-Film Optical Filters* (Third Edition, H. A. Macleod, Institute of Physics Publishing, Bristol and Philadelphia, 2001), which is incorporated herein by reference. Blocking beyond that which would result from a single quarter-wave stack of layers (which itself is present due to function of the quarter-wave stack in forming the filter edge) is referred to as "extended blocking." Such extended blocking over a wavelength region results from a more complex layer structure than merely a quarter-wave stack, and includes, for example, multiple quarter-wave stacks optimally combined into a single coating, or a "chirped" quarter-wave stack in which each of the high and low index layer thicknesses are monotonically increasing or decreasing over at least a portion of the coating.

In addition, spectral characteristic 200-3 has an average optical density greater than 4, and may be more than 5, over second blocking band of wavelengths 225 extending from a third blocking wavelength $\lambda_{3block}$ to a fourth blocking wavelength, $\lambda_{4block}$, the fourth blocking wavelength satisfies:

$$\lambda_{4block} > 1.1*((1+x)/(1-x))*\lambda_{3block},$$

Theoretically, the factors 0.9 and 1.1 in the above formulas do not define the upper and lower bounds of $\lambda_{2block}$ and $\lambda_{4block}$, respectively. In practice, however, due to uncertainties in the precise values of the refractive indexes of the deposited layers that constitute coating 111 (such as inability to measure the index precisely and slight variations of the index with wavelength and environmental conditions) and other non-idealities (such as measurement uncertainty), the values of $\lambda_{2block}$ and $\lambda_{4block}$ that are actually observed can extend slightly below and above, respectively, that which is theoretically predicted. Accordingly, the above formulas take into account such non-idealities by incorporating a factor of 0.9 in the formula for $\lambda_{2block}$ and a factor of 1.1 in the formula for $\lambda_{4block}$ in order to reflect that which may actually be observed.

A value for $\lambda_{4block}$ as determined by the equation above may ensure that the blocking on the long-wavelength side of the passband is comprised of extended blocking, or blocking over a wider range than would result from a single quarter-wave stack of layers, in analogy to the description of short-wavelength-side extended blocking above.

A first edge band of wavelengths 230 is associated with first edge portion 210 adjacent passband 205. First edge band of wavelengths 230 extends from $\lambda_{1passband}$ to $\lambda_{1block}$, such that, at a first transmission wavelength, $\lambda_{1\text{-}50\%}$, within first edge band of wavelengths 230, coating 111 has a transmissivity of 50%, and $\lambda_{1passband}$, $\lambda_{1block}$, and $\lambda_{1\text{-}50\%}$, satisfy:

$$(\lambda_{1passband} - \lambda_{1block})/\lambda_{1\text{-}50\%} < 2\%.$$

Further, a second edge band of wavelengths 240 is associated with a second edge portion 220 of spectral characteristic 200 adjacent passband 205. Second edge band of wavelengths 240 extends from $\lambda_{2passband}$ to $\lambda_{3block}$, and, as shown in FIG. 2c, $\lambda_{3block}$ is greater than $\lambda_{2passband}$. In addition, at a second transmission wavelength, $\lambda_{2\text{-}50\%}$, within second edge band of wavelengths 240, coating 111 has a transmissivity of 50%, and $\lambda_{2passband}$, $\lambda_{3block}$, and $\lambda_{2\text{-}50\%}$, satisfy:

$$(\lambda_{3block} - \lambda_{2passband})/\lambda_{2\text{-}50\%} < 2\%.$$

A first portion 201 of spectral characteristic 200-3 extending from $\lambda_{2block}$ to $\lambda_{1EB}$ has reduced transmission and constitutes a range of extended blocking associated with first coating portion 118. A second portion 202 of spectral characteristic 200 extending from $\lambda_{1EB}$ to a center wavelength $\lambda_0$ of passband 205 constitutes part of a long-wave-pass edge filter spectrum attributable to third coating portion 116, and a third portion 203 extending from center wavelength $\lambda_0$ to $\lambda_{2EB}$ constitutes part of a short-wave pass edge filter spectrum attributable to second coating portion 114. Extended blocking of portion 204 of spectral characteristic 200-3 extends from $\lambda_{2EB}$ to $\lambda_{4block}$, and is attributable to coating portion 112.

In the above exemplary transmission characteristic 200-3, $\lambda_{2block}$ may be substantially equal to 400 nm and $\lambda_{4block}$ may be substantially equal to 700 nm. In addition, spectral characteristic 200-3 may have an average OD greater than 2 over a band of wavelengths extending from $\lambda_{4block}$ (e.g., 700 nm) to 1000 nm or 1100 nm. $\lambda_{4block}$ may also be substantially equal to 900 nm. Further, consistent with the present disclosure, the passband may have a bandwidth, measured as the minimum spectral distance between $\lambda_{1block}$ and $\lambda_{3block}$, (both of which typically having an associated optical density of 4, and being referred to as "OD 4 points"), which is greater than 2% of the center wavelength $\lambda_0$. Accordingly, for example, for a center wavelength $\lambda_0$ of 550 nm, the passband bandwidth (i.e., the minimum spectral distance between $\lambda_{1block}$ and $\lambda_{3block}$) is greater than 11 nm. Exemplary passband bandwidths may be between 10 nm and 80 nm and exemplary center wavelengths may be within 380 nm to 700 nm.

As noted above, first coating portion 112 may be omitted. In that case, the resulting spectral characteristic will lack extended blocking over longer wavelengths beyond $\lambda_{2EB}$ (see spectral characteristic 200-1 in FIG. 2a). Also, if fourth coating portion 118 were omitted, the resulting spectral characteristic would not provide extended blocking at shorter wavelengths less than $\lambda_{1EB}$ (see spectral characteristic 200-2 in FIG. 2b).

Returning to FIG. 1, consistent with a further aspect of the present disclosure, an anti-reflection coating 124 may be provided on a second surface 122 of substrate 110 opposite first surface 120. Anti-reflection coating 124 is typically configured to substantially prevent reflection of light having a wavelength within passband 205.

Figure 3:
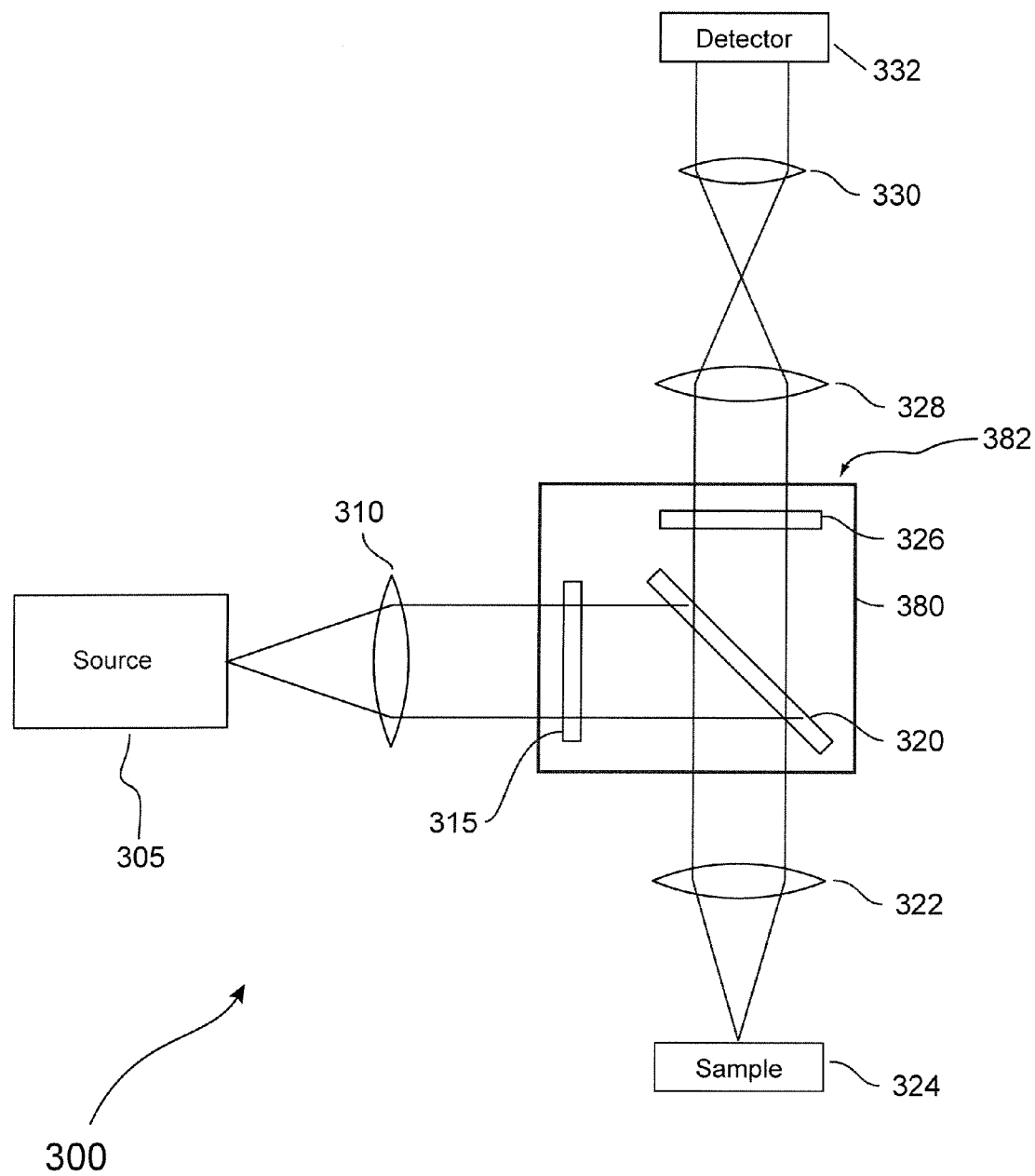
FIG. 3 illustrates a fluorescence spectroscopy system consistent with a further aspect of the present disclosure.

FIG. 3 illustrates a fluorescence spectroscopy system 300, such as a fluorescence microscope, consistent with a further aspect of the present disclosure. System 300 includes a source 305, which may be a broadband optical source or a laser. Light from source 305 is directed toward a collimating lens or lens group 310 and passed to an exciter filter 315, which may have a construction similar to that discussed above in regard to FIG. 1 and a spectral characteristic similar to that shown in FIG. 2. Filtered light transmitted through filter 315 is next reflected off of dichroic beamsplitter 320, and passed through lens or lens group 322 to sample 324. In response to such excitation light, sample 324 fluoresces and emits or outputs light at a wavelength different than the excitation light. Such emitted light passes through lens 322 and dichroic beamsplitter 320. The emitted light next passes through emission filter 326, which also has a similar construction as filter 100 but a transmission characteristic 600 (see FIG. 6, which is discussed in greater detail below) that differs from that shown in FIG. 2. The filtered emission light passes through lenses or lens groups 328 and 330 and is then sensed by visual inspection or with a detector 332, which, for example, may generate an image of a portion of sample 324. As further shown in FIG. 3, filters 315, 320, and 326 may be mounted in housing 380.

Filters consistent with the present disclosure may be incorporated into commercially available fluorescence microscopes, such as the BX41 microscope available from Olympus America Inc.

Figure 4:
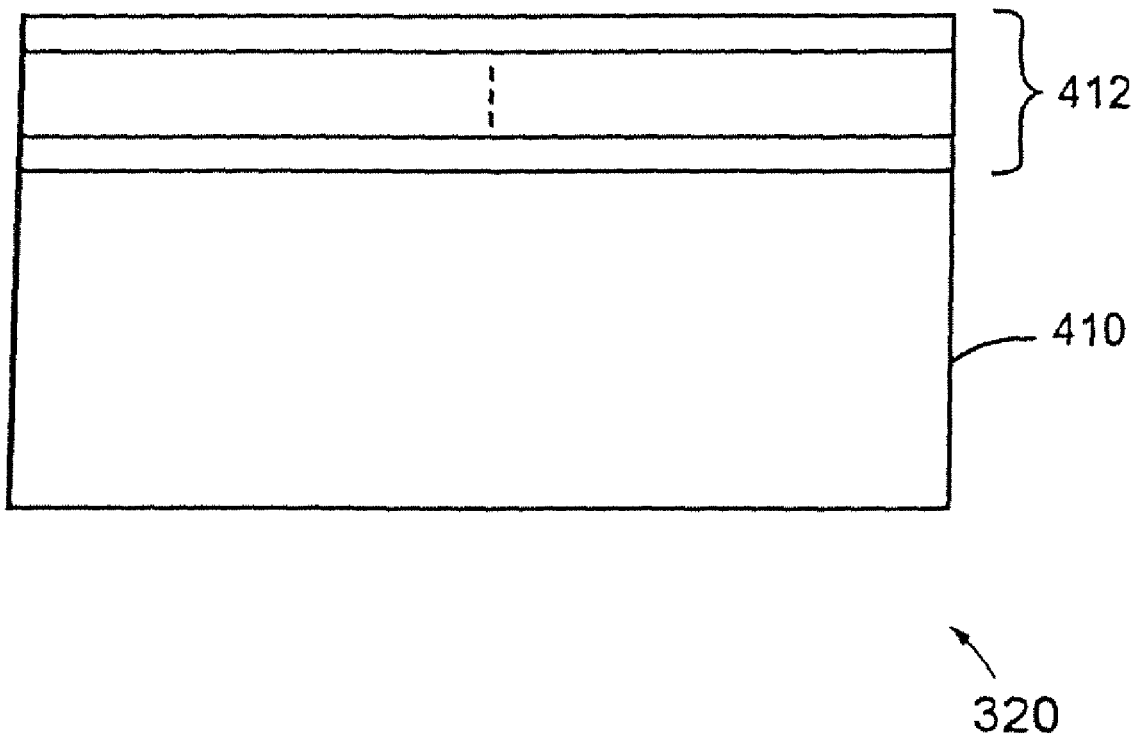
FIG. 4 illustrates a cross-sectional view of a dichroic beamsplitter consistent with an additional aspect of the present disclosure.
Figure 5:
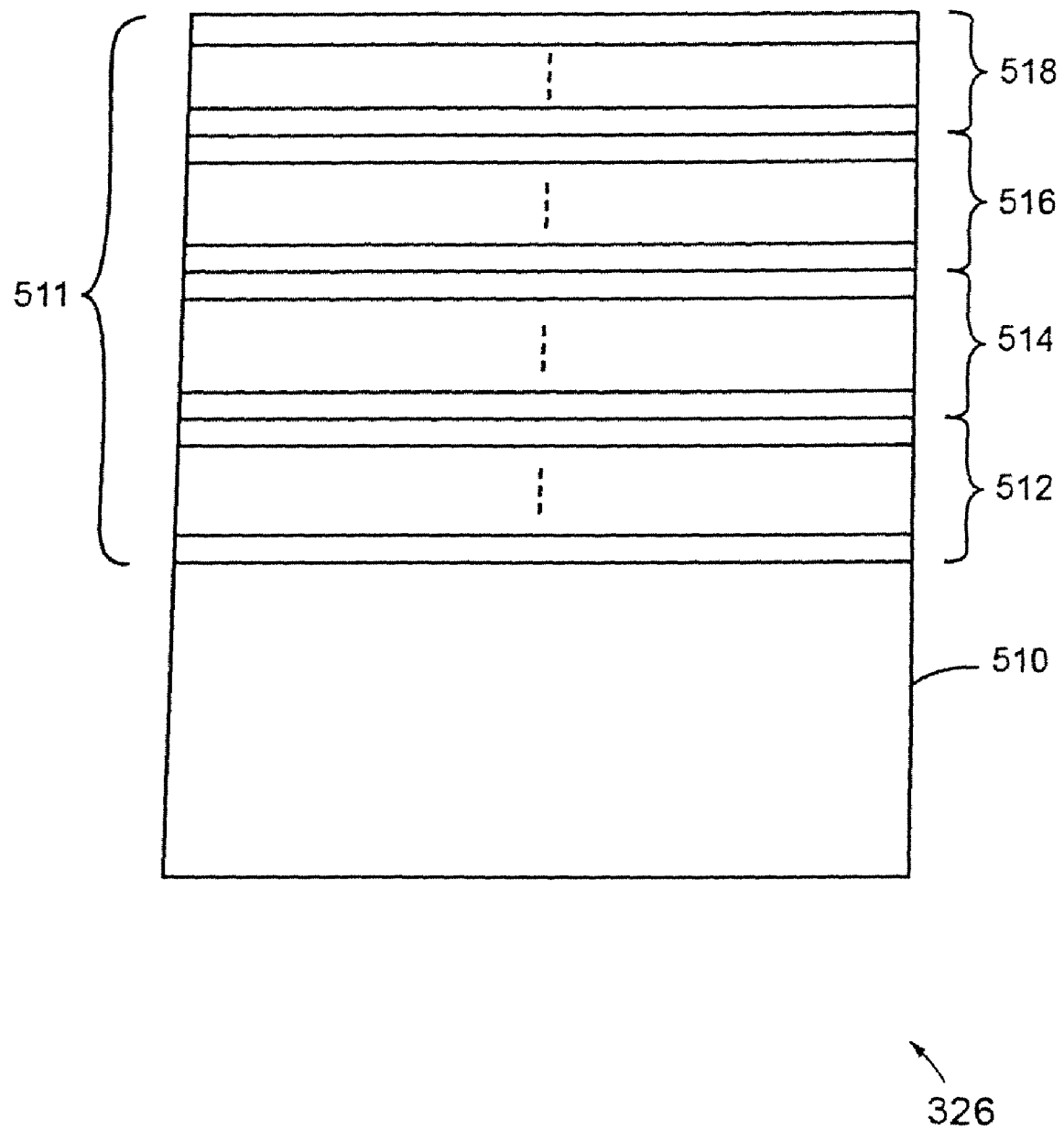
FIG. 5 illustrates a cross-sectional view of a filter consistent with the present disclosure.

FIGS. 4 and 5 show dichroic beam splitter 320 and emission filter 326, respectively, in greater detail. Dichroic beam splitter 320 includes a hard-coating 412 including a plurality of hard alternating refractive index layers provided on substrate 410, and emission filter 326 has a coating 511, which includes first (512), second (514), third (516), and fourth (518) coating portions, each of which including alternating hard-coating refractive index layers. Coating portions 512, 514, 516, and 518 have a similar structure as coating portions 112, 114, 116, and 118, respectively. The individual high ($n_{H2}$) and low ($n_{L2}$) refractive index layers that make up each of layers coating portions 512, 514, 516, and 518 may have the same or different refractive indices as layers coating portions 112, 114, 116, and 118.

Figure 6:
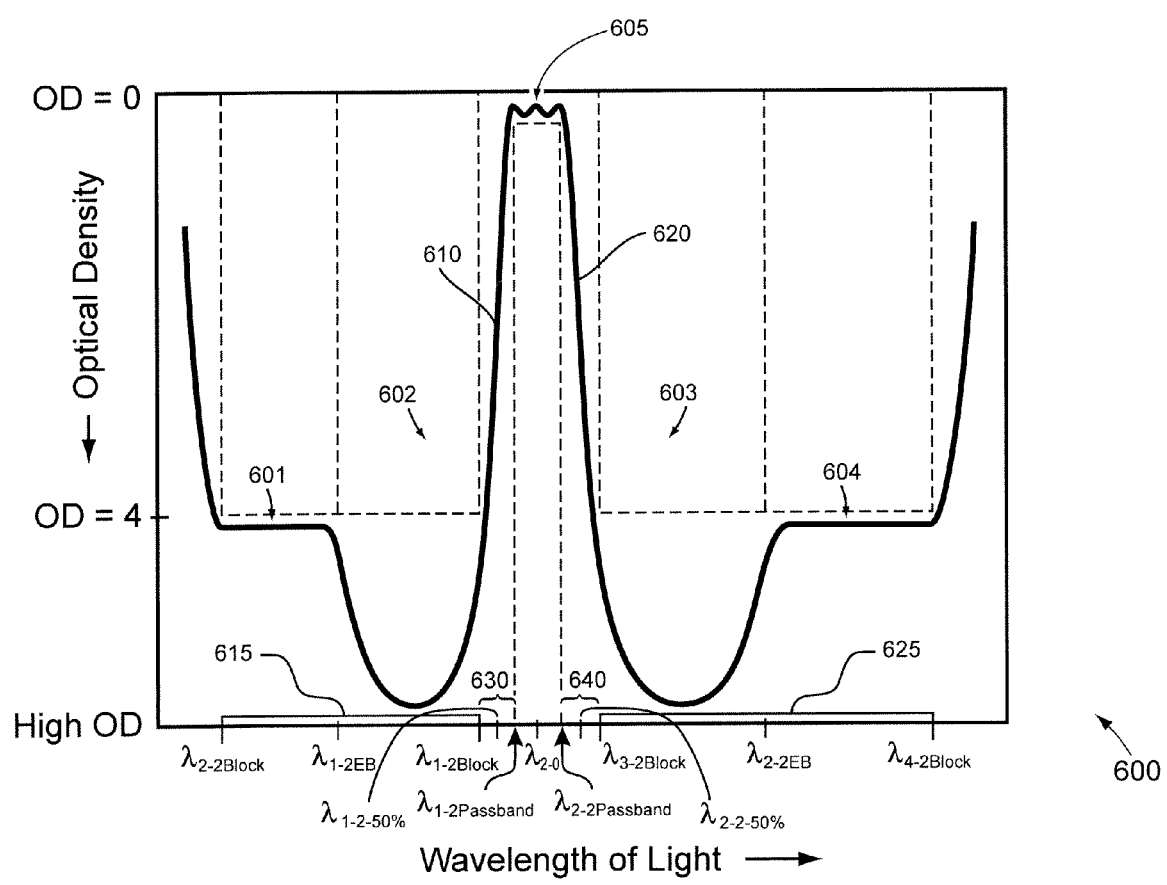
FIG. 6 illustrates a spectral characteristic associated with the filter shown in FIG. 5.

The spectral characteristic 600 of emission filter 326 is shown in FIG. 6 and is similar in shape to spectral characteristic 200 shown in FIG. 2. Spectral characteristic 600 has a passband 605, which is defined by passband wavelengths $\lambda_{1\text{-}2passband}$ and $\lambda_{2\text{-}2passband}$. Spectral characteristic 600 has an average transmissivity at least equal to 80% over passband 605, and an average optical density greater than 4 over a lower blocking band of wavelengths 615 extending from wave length $\lambda_{1-2block}$ to wavelength $\lambda_{2-2block}$. Preferably, $\lambda_{2-2block}$ satisfies:

$$\lambda_{2block} \leq 0.9*((1-x)/(1+x))*\lambda_{1block},$$

In addition, spectral characteristic 600 has an average optical density greater than 4 over an upper blocking band of wavelengths 625 extending from wavelength $\lambda_{3-2block}$ to wavelength, $\lambda_{4-2block}$, $\lambda_{4-2block}$ satisfying:

$$\lambda_{4block} \geq 1.1*((1+x)/(1-x))*\lambda_{3block},$$

where $$x = \frac{2}{\pi}\arcsin\left(\frac{n_{H2}-n_{L2}}{n_{H2}+n_{L2}}\right),$$

A lower edge band of wavelengths 630 is associated with a lower edge portion 610 adjacent passband 605. Lower edge band of wavelengths 630 extends from $\lambda_{1-2passband}$ to $\lambda_{1-2block}$, such that, at wavelength $\lambda_{1-2-50\%}$, within lower edge band of wavelengths 630, coating 111 has a transmissivity of 50%, and $\lambda_{1-2passband}$, $\lambda_{1-2block}$, and $\lambda_{1-2-50\%}$, satisfy:

$$(\lambda_{1-2passband}-\lambda_{1-2block})/\lambda_{1-2-50\%} < 2\%.$$

Further, an upper edge band of wavelengths 640 is associated with an upper edge portion 620 of spectral characteristic 600 adjacent passband 605. Upper edge band of wavelengths 640 extends from $\lambda_{2-2passband}$ to $\lambda_{3-2block}$, such that, at wavelength $\lambda_{2-50\%}$, within upper edge band of wavelengths 640, coating 511 (FIG. 5) has a transmissivity of 50%, and $\lambda_{2-2passband}$, $\lambda_{3-2block}$, and $\lambda_{2-2-50\%}$, satisfy:

$$(\lambda_{3-2block}-\lambda_{2-2passband})/\lambda_{2-2-50\%} < 2\%.$$

A first portion 601 of spectral characteristic 600 extending from $\lambda_{2-2block}$ to $\lambda_{1-2EB}$ has reduced transmission and constitutes a range of extended blocking associated with coating portion 518. A second portion 602 of spectral characteristic 600 extending from $\lambda_{1-2EB}$ to a center wavelength $\lambda_{2-0}$ of passband 605 constitutes part of long-wave-pass edge filter spectrum attributable to third coating portion 516, and a third portion 603 extending from center wavelength $\lambda_{2-0}$ to $\lambda_{2-2EB}$ constitutes part of a short-wave pass edge filter spectrum attributable to second coating portion 514. Extended blocking of portion 604 of spectral characteristic 600 extends from $\lambda_{2-2EB}$ to $\lambda_{4-2block}$, and is attributable to coating portion 512. Passband 605, measured as the minimum spectral distance between $\lambda_{1-2block}$ and $\lambda_{3-2block}$, has a bandwidth similar to that of the passband bandwidth of spectral characteristic 200-3 discussed above in connection with FIG. 2c. Both $\lambda_{1-2block}$ and $\lambda_{3-2block}$ are OD 4 points.

It is noted that if extended blocking is not required at longer wavelengths, coating portion 512 may be omitted, such that extended blocking of portion 604 would not be provided for wavelengths greater than $\lambda_{2-2EB}$. In that case, spectral characteristic 600 would resemble spectral characteristic 200-1 shown in FIG. 2a. Likewise, if desired, coating portion 518 may be omitted, such that extended blocking would not be provided at wavelengths less than $\lambda_{1-2EB}$, and the resulting spectral characteristic would be similar to spectral characteristic 200-2 shown in FIG. 2b.

Returning to FIGS. 3-5, layer 412 of dichroic beam splitter 320 is configured to reflect light within the passband of exciter filter 315 (corresponding to passband 205 discussed above). In that case, the excitation light wavelength is preferably within the lower blocking band of wavelengths 615, and coating 511 is configured to pass light emitted from the sample at a wavelength within second blocking band of wavelengths 225 (see FIG. 2). In addition, layer 412 is configured to pass the emission light. Preferably, the emission light has a wavelength within passband 605. With filters 315, 320, and 326 so configured, relatively little excitation light from 305 reaches detector 332, thereby improving the quality of the image output by fluorescence spectroscopy system 300.

Alternatively, the locations of detector 332 and source 305 may be switched, as well as the locations of filters 315 and 326. In this example, dichroic beam splitter 320 passes excitation light, which has a wavelength within passband 205, and reflects light at the emission light wavelength (in passband 605), such that the emission light is reflected toward detector 332.

In FIG. 3, each of filters 315, 320, and 326 may be considered as constituting a filter set 382. Accordingly, since each filter has an associated substrate, filter set 382 has three substrates. Consistent with an additional aspect of the present disclosure, however, the number of substrates in a filter set may be reduced by providing multiple coatings on a single substrate. Examples of alternative filter sets 701-703 will next be described with reference to FIGS. 7a-7c, respectively.

Figure 7A:
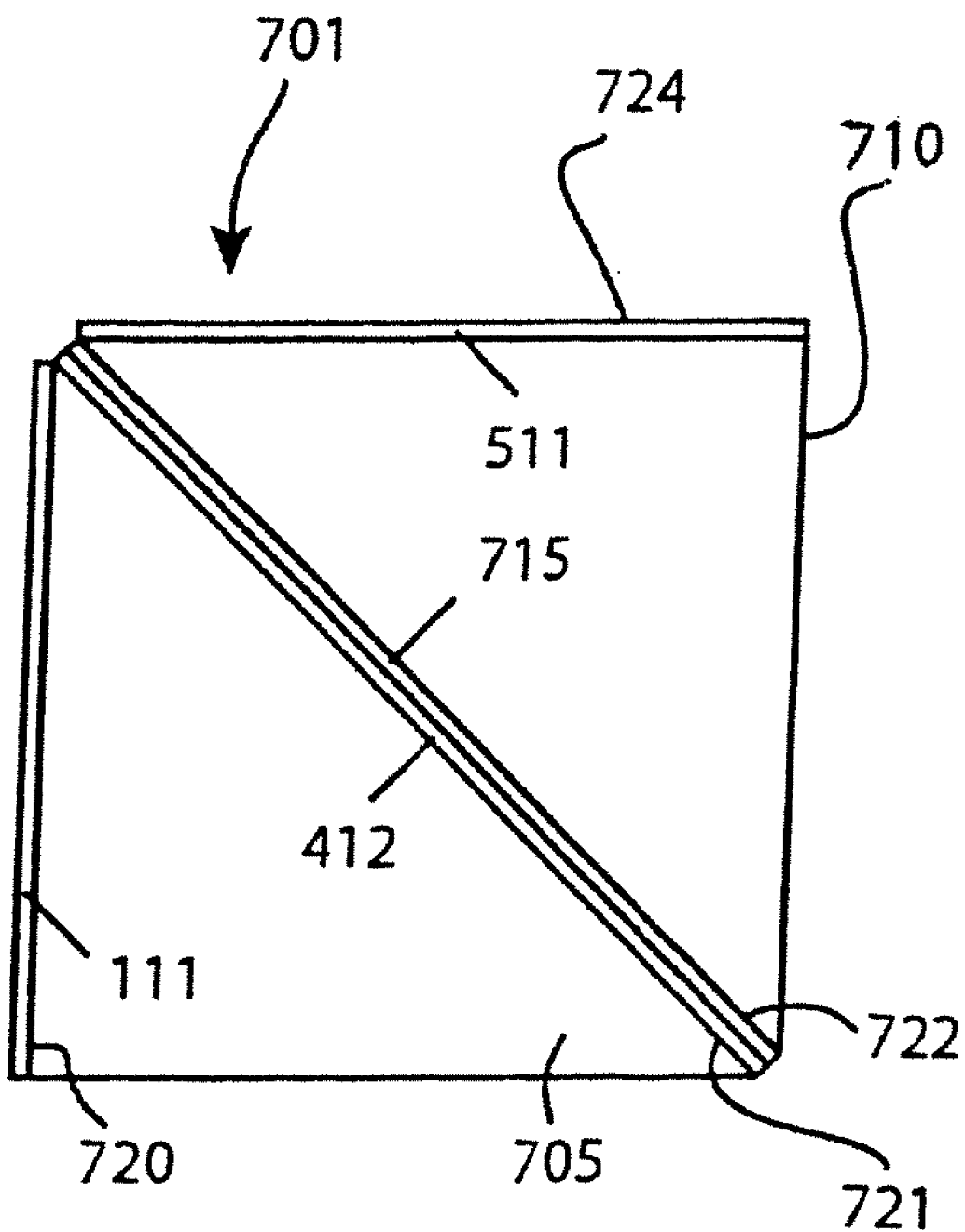
FIGS. 7a-7c illustrate filter sets consistent with additional aspects of the present disclosure.

FIG. 7a illustrates a filter set 701 including right-angle prisms constituting substrates 705 and 710. Coating 111 of filter 100 may be provided in contact with side surface 720 of substrate 705, while coating 412 of filter 320 may be provided on hypotenuse surface 721. In addition, coating 511 of filter 326 may be provided on side surface 724 of substrate 710. As further shown in FIG. 7a, coating 412 is spaced from hypotenuse surface 722 of substrate 710 by an air gap 715.

Figure 7B:
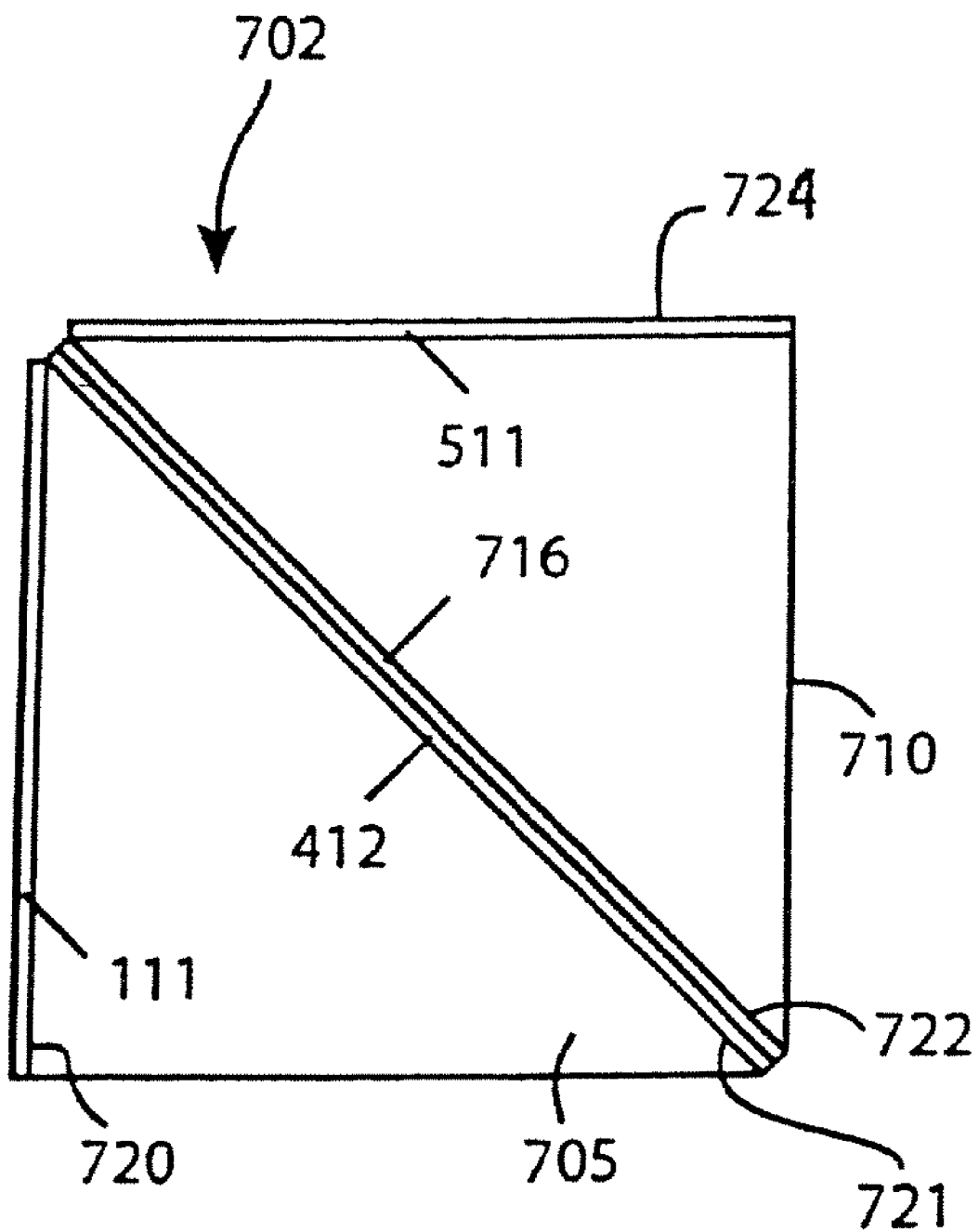
Figure 7C:
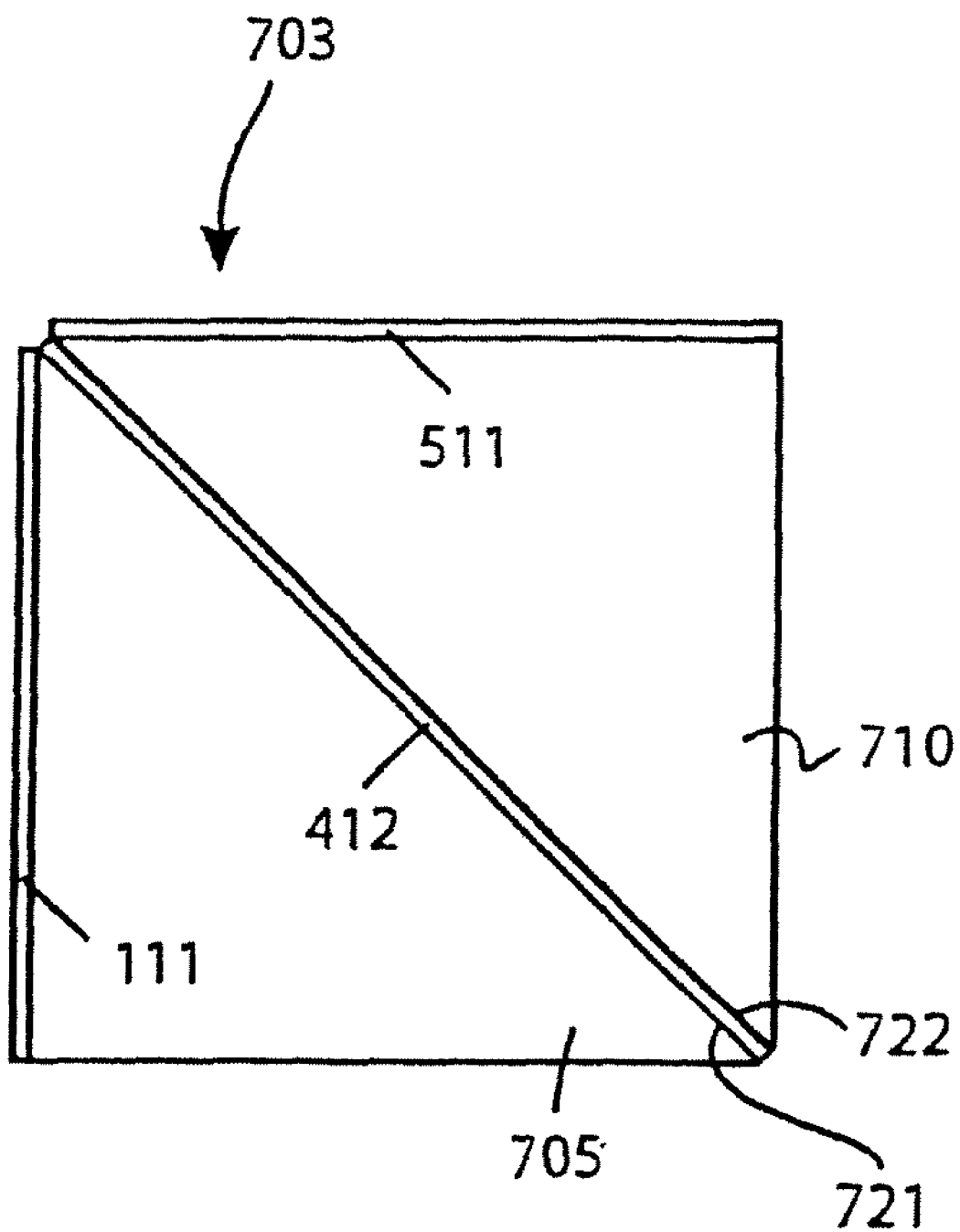

Filter set 702 shown in FIG. 7b is similar to filter set 701, however, air gap 715 is filled with a conventional optical cement 716. Further, in filter set 703 shown in FIG. 7c, coating 412 contacts both hypotenuse surfaces 721 and 722 of substrates 705 and 710, respectively. In each of FIGS. 7a-7c, surfaces 721 and 722 face one another so that filters sets 701-703 have a substantially cubical structure.

Figure 8:
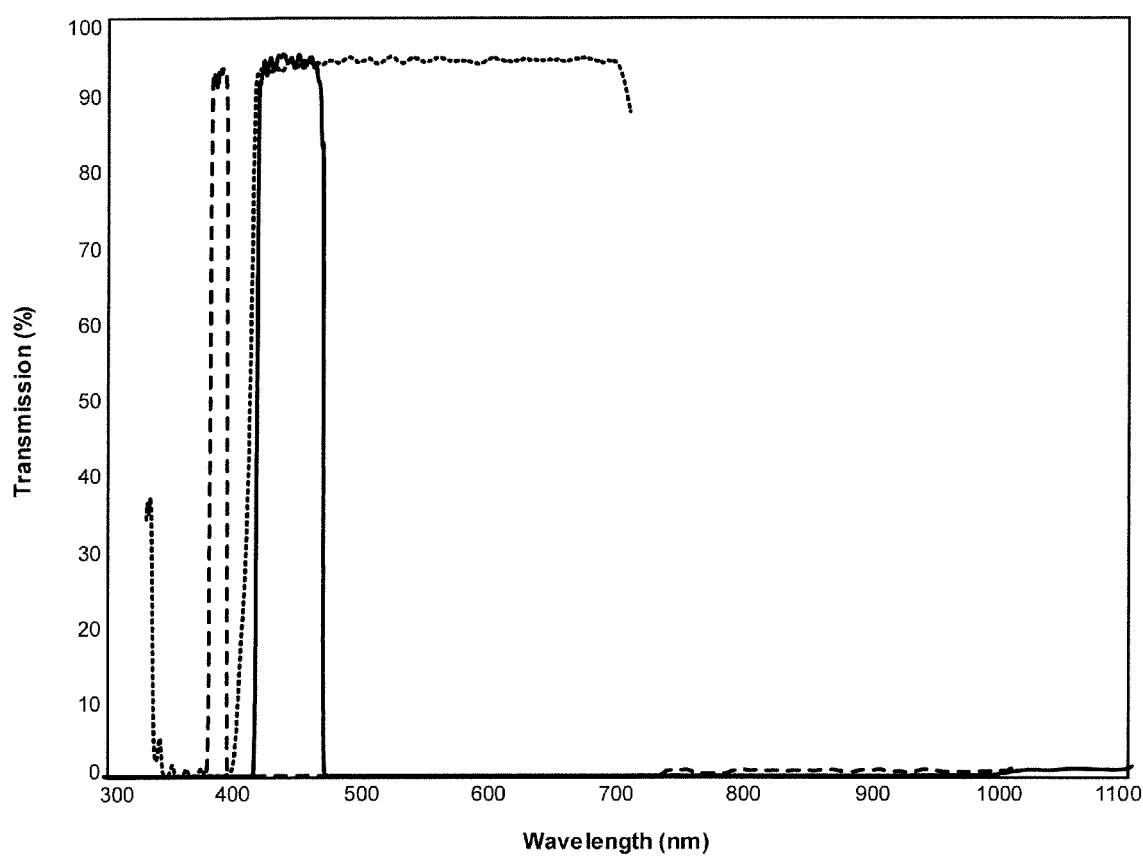
FIGS. 8-15 illustrate spectral plots in connection with filters consistent with the present disclosure.
Figure 9:
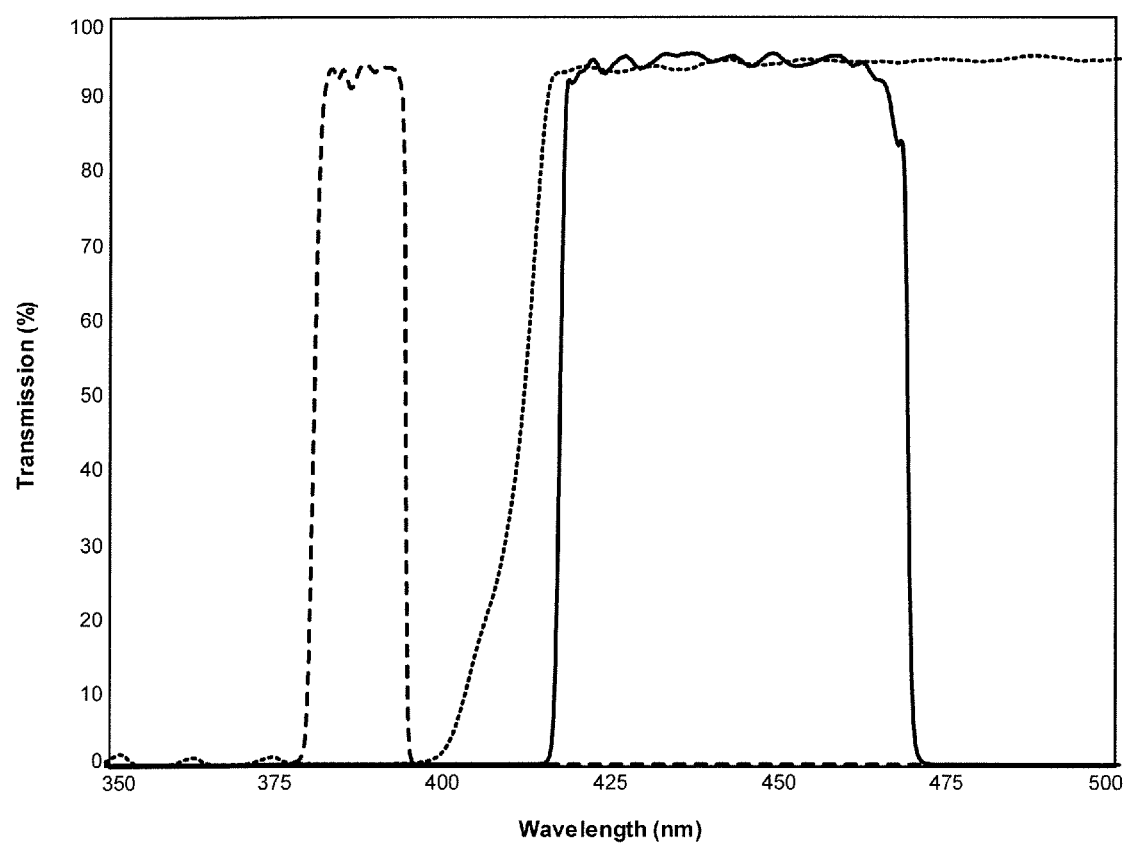
Figure 10:
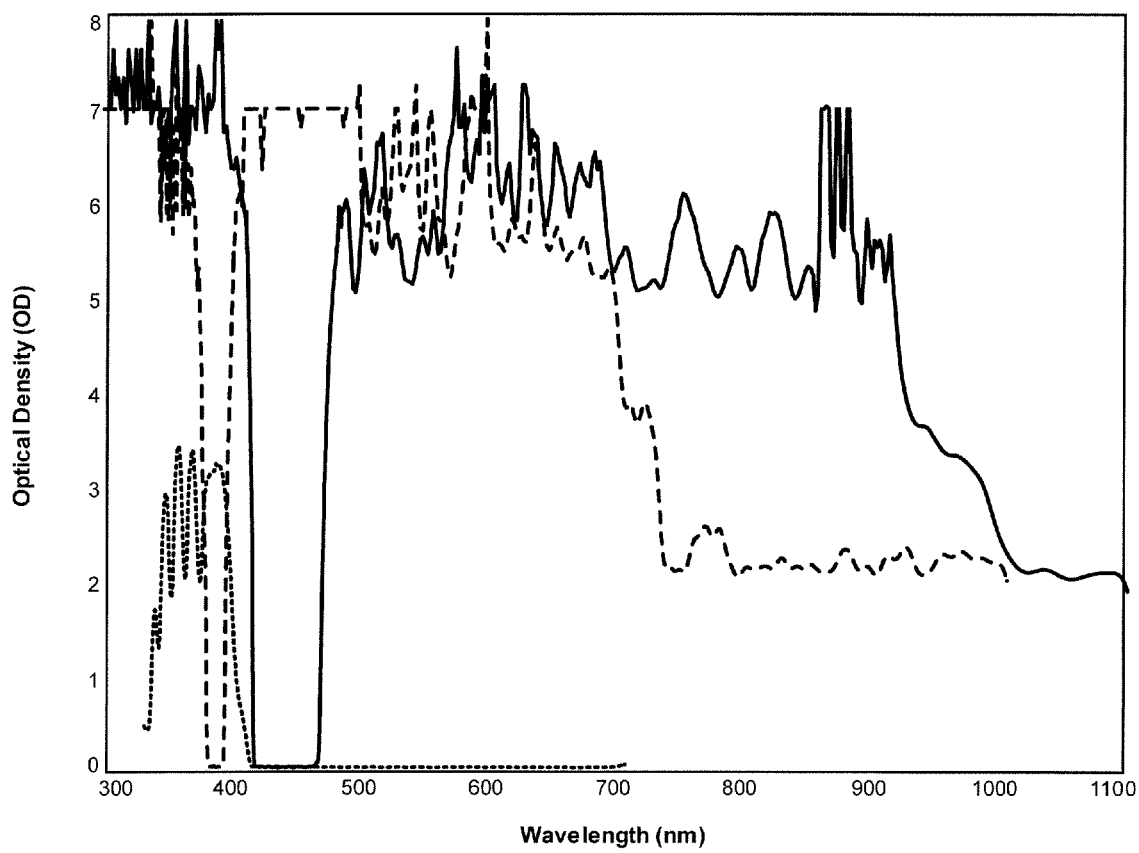
Figure 11:
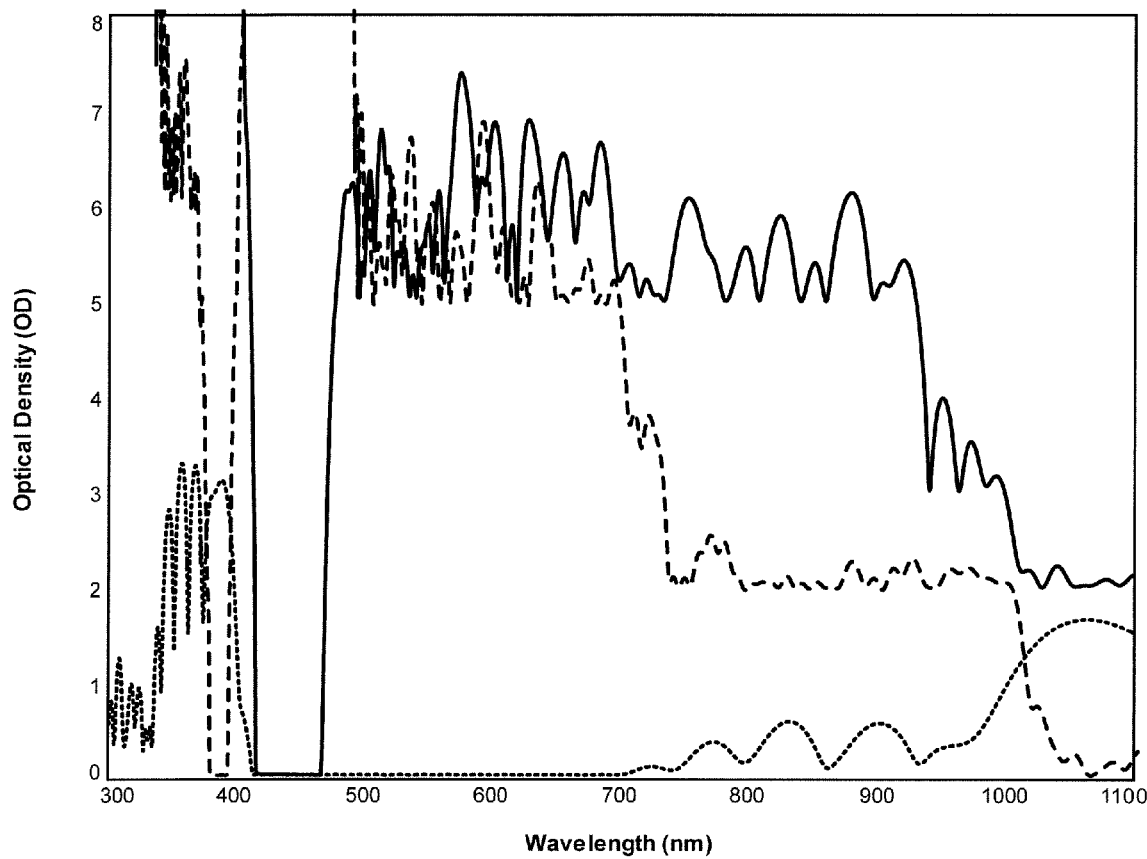

Exemplary spectra associated with filter sets consistent with the present disclosure will next be described with reference to FIGS. 8-15. FIG. 8 is a composite of measured exciter filter (dashed curve), dichroic beamsplitter (dotted curve), and emitter filter (solid curve) spectra over a wavelength range of 300 nm to 1100 nm, and FIG. 9 shows an enlarged view of these spectra over a range of 350 nm-500 nm. In FIGS. 8 and 9, transmission (%) is plotted as a function of wavelength. FIG. 10 is equivalent to FIG. 8, but optical density ("OD", where OD=$-\log_{10}(T)$, T being a transmission measured between 0 and 1) is plotted instead of transmission. FIG. 11 illustrates theoretical OD plots which closely approximate the measured OD plots shown in FIG. 10. The curves shown in FIGS. 8-11 are associated with filters to be used in connection with a sample including a known Calcofluor White dye.

Figure 12:
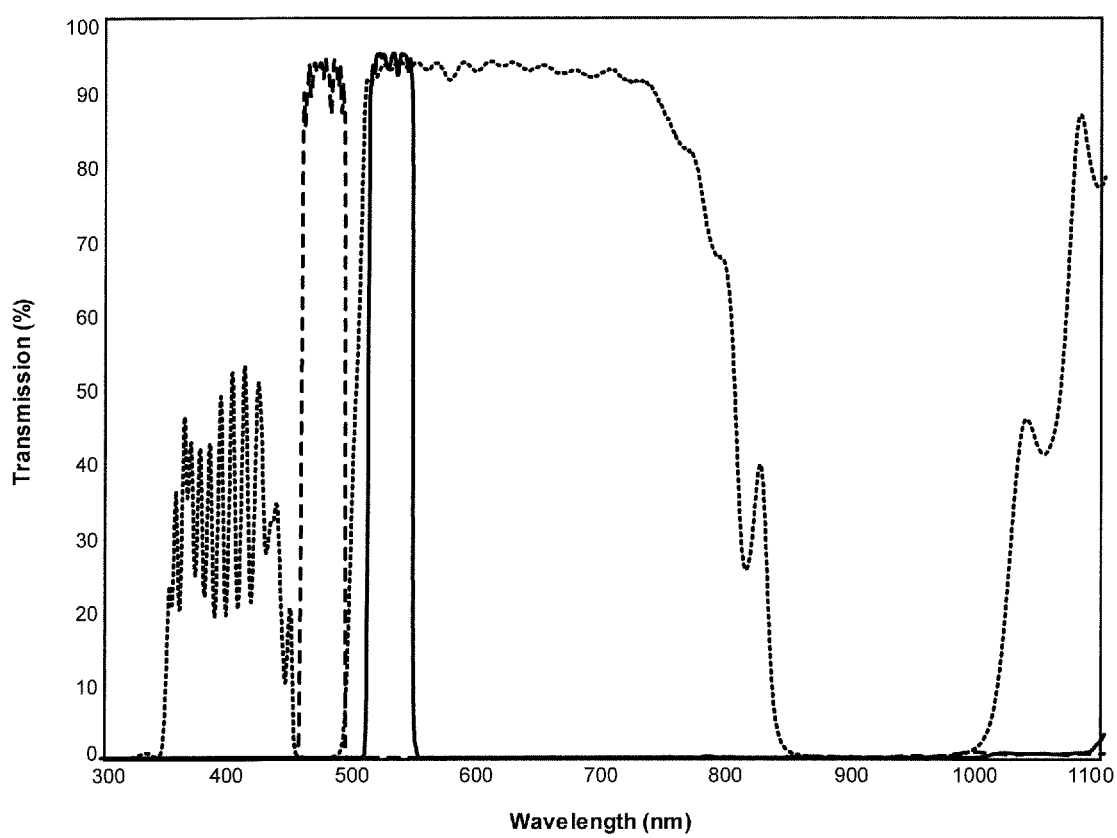
Figure 13:
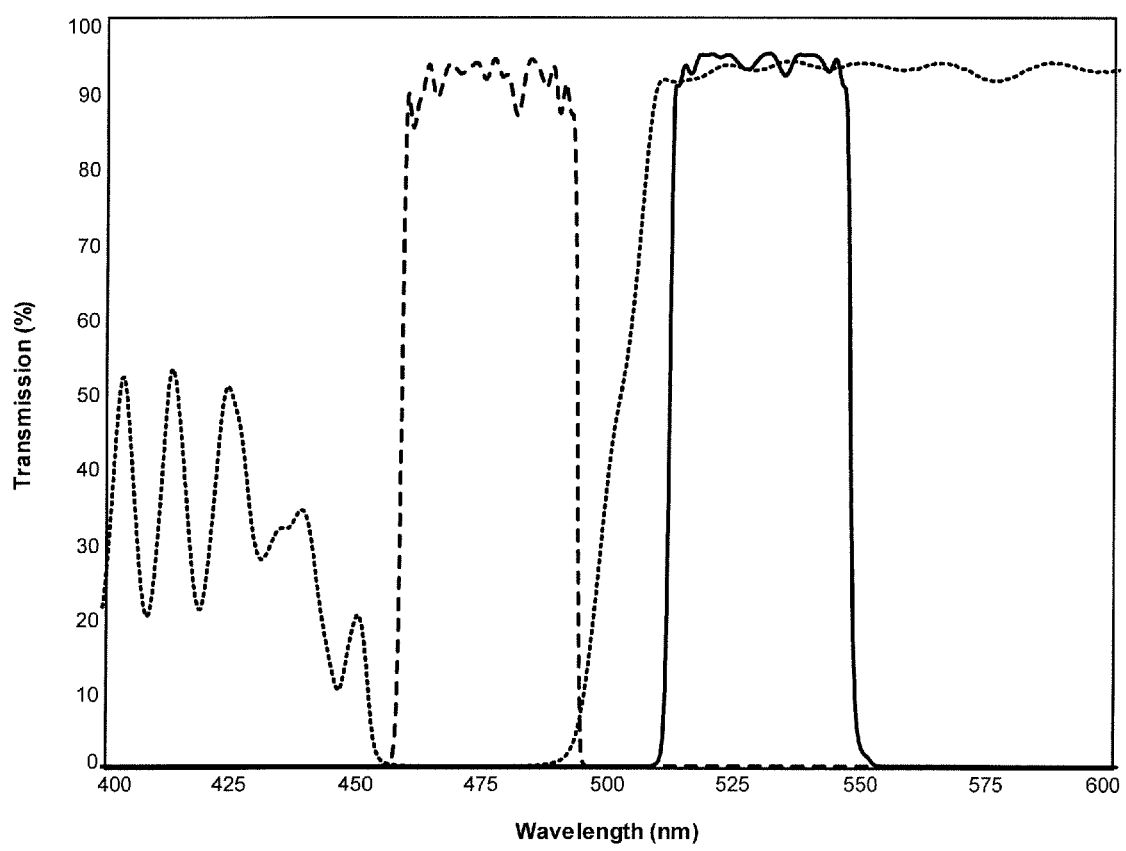
Figure 14:
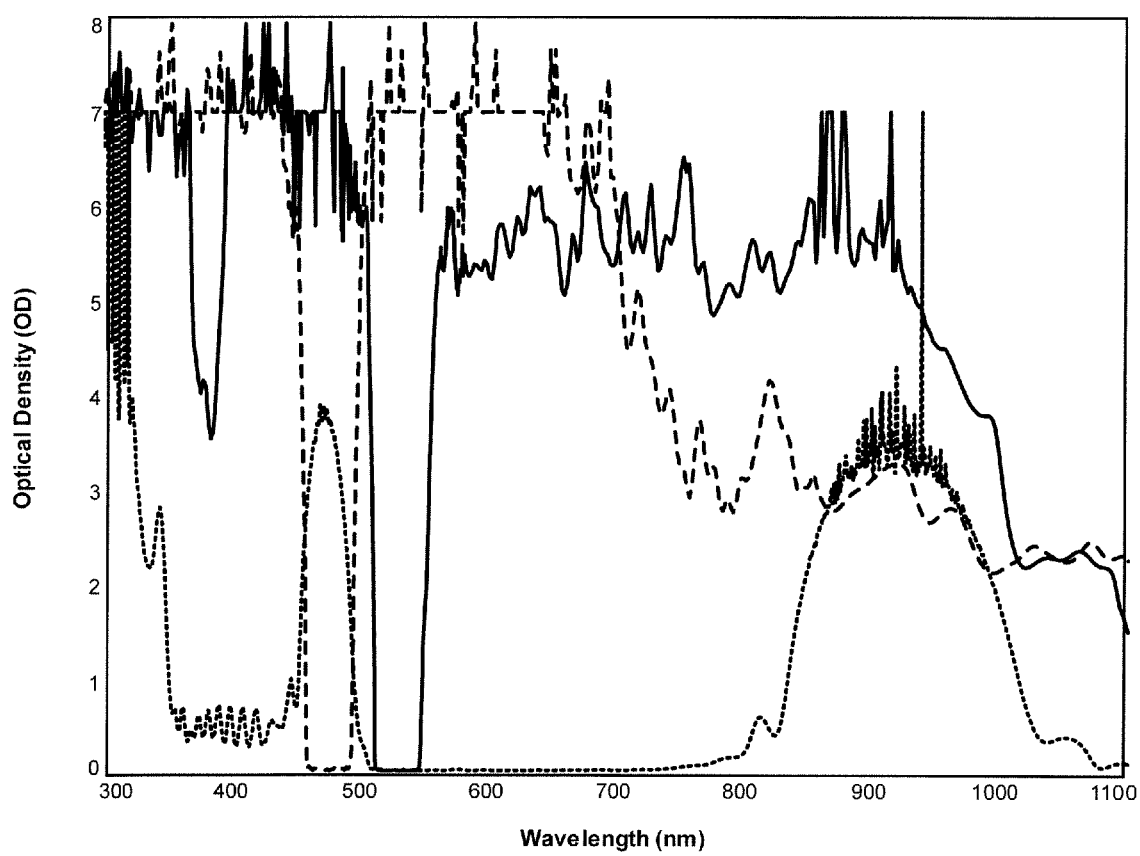
Figure 15:
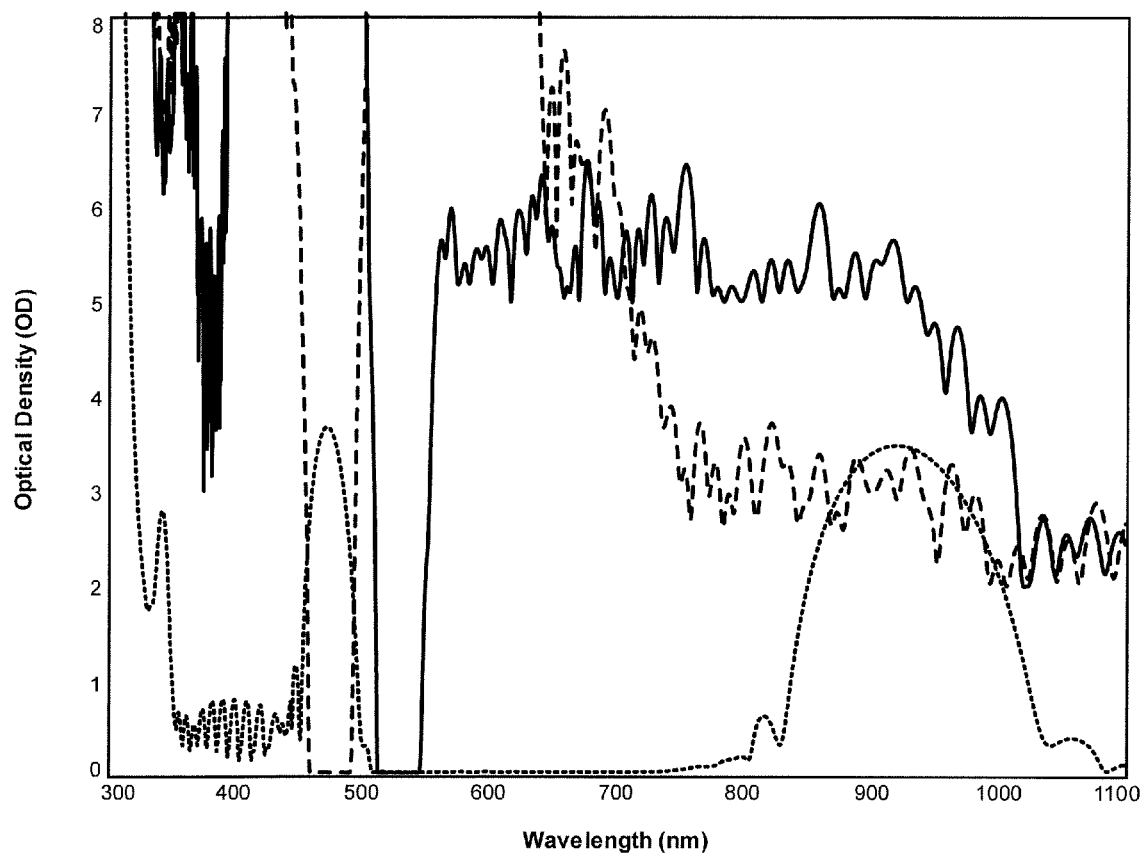

Similar plots were obtained in connection with a filter set suitable for use with samples including fluorescein isothiocyanate (FITC), as shown in FIGS. 12-15. Namely, measured transmission vs. wavelength plots over 300 nm-1100 nm and 400 nm-600 nm are shown in FIGS. 12 and 13, respectively. Here also, the dashed curve in FIGS. 12 and 13 corresponds to the exciter filter spectrum, the dotted curve in these figures corresponds to the dichroic beam splitter spectrum, and the solid curve in these figures corresponds to the emitter filter spectrum. An OD plot equivalent to FIG. 12 is shown in FIG. 14, which closely tracks the theoretical OD plot shown in FIG. 15.

As discussed above, the present disclosure describes a filter in which a coating, preferably provided on a single substrate, has sharp passband edges as well as extended blocking. Filter sets employing such filters can be realized with three or fewer substrates, thereby simplifying system design and reducing costs.

Tables 1 and 2 below list exemplary individual layer thicknesses associated with the exciter filter, dichroic beamsplitter, and emitter filter spectra discussed above. Tables 1 and 2 correspond to the above described filter sets for use in connection with Calcofluor White and FITC dyes, respectively.

It is intended that the specification and examples be considered as exemplary only, with a true scope and spirit of the invention being indicated by the following claims.

TABLE 1

| | Exciter Thickness (μm): 18.10235289 Total Layers: 252 | | Dichroic Thickness (μm): 4.30942641 Total Layers: 42 | | Emitter Thickness (μm): 15.30518641 Total Layers: 194 | |
|---|---|---|---|---|---|---|
| Layer | Material | Thickness (nm) | Material | Thickness (nm) | Material | Thickness (nm) |
| 1 | Ta2O5 | 21.542528 | Ta2O5 | 18.000001 | Nb2O5 | 15 |
| 2 | SiO2 | 55.843133 | SiO2 | 45.229547 | SiO2 | 53.841577 |
| 3 | Ta2O5 | 30.894336 | Ta2O5 | 143.803044 | Nb2O5 | 26.05551 |
| 4 | SiO2 | 53.362462 | SiO2 | 198.835667 | SiO2 | 59.414165 |
| 5 | Ta2O5 | 35.710448 | Ta2O5 | 120.273508 | Nb2O5 | 30.883961 |
| 6 | SiO2 | 52.515375 | SiO2 | 180.766523 | SiO2 | 60.058802 |
| 7 | Ta2O5 | 32.47336 | Ta2O5 | 126.919956 | Nb2O5 | 30.839114 |
| 8 | SiO2 | 56.175247 | SiO2 | 209.7412 | SiO2 | 60.260543 |
| 9 | Ta2O5 | 37.12421 | Ta2O5 | 140.751131 | Nb2O5 | 29.978574 |
| 10 | SiO2 | 52.311916 | SiO2 | 216.766227 | SiO2 | 60.230434 |
| 11 | Ta2O5 | 38.088323 | Ta2O5 | 141.535809 | Nb2O5 | 36.339558 |
| 12 | SiO2 | 55.228444 | SiO2 | 219.386661 | SiO2 | 60.128235 |
| 13 | Ta2O5 | 36.11487 | Ta2O5 | 141.508871 | Nb2O5 | 33.433398 |
| 14 | SiO2 | 56.085383 | SiO2 | 219.067385 | SiO2 | 60.27866 |
| 15 | Ta2O5 | 35.883605 | Ta2O5 | 143.744437 | Nb2O5 | 32.321118 |
| 16 | SiO2 | 53.428594 | SiO2 | 217.84547 | SiO2 | 60.290167 |
| 17 | Ta2O5 | 38.749063 | Ta2O5 | 142.615164 | Nb2O5 | 32.971644 |
| 18 | SiO2 | 55.005335 | SiO2 | 219.96471 | SiO2 | 60.084473 |
| 19 | Ta2O5 | 33.125595 | Ta2O5 | 148.345141 | Nb2O5 | 38.854117 |
| 20 | SiO2 | 53.620042 | SiO2 | 74.853541 | SiO2 | 60.333791 |
| 21 | Ta2O5 | 38.709828 | Ta2O5 | 27.5237 | Nb2O5 | 30.131382 |
| 22 | SiO2 | 55.970609 | SiO2 | 63.705179 | SiO2 | 60.213917 |
| 23 | Ta2O5 | 35.304189 | Ta2O5 | 50.085785 | Nb2O5 | 36.413843 |
| 24 | SiO2 | 55.767196 | SiO2 | 82.713346 | SiO2 | 60.250527 |
| 25 | Ta2O5 | 36.78825 | Ta2O5 | 18.867521 | Nb2O5 | 34.726858 |
| 26 | SiO2 | 55.150101 | SiO2 | 87.295223 | SiO2 | 60.257074 |
| 27 | Ta2O5 | 35.74457 | Ta2O5 | 57.591256 | Nb2O5 | 32.771514 |
| 28 | SiO2 | 57.804198 | SiO2 | 48.795137 | SiO2 | 60.214228 |
| 29 | Ta2O5 | 36.902705 | Ta2O5 | 31.273588 | Nb2O5 | 35.342404 |
| 30 | SiO2 | 55.763948 | SiO2 | 87.382707 | SiO2 | 60.189456 |
| 31 | Ta2O5 | 35.352542 | Ta2O5 | 57.951009 | Nb2O5 | 37.402842 |
| 32 | SiO2 | 56.062901 | SiO2 | 25.668132 | SiO2 | 60.117843 |
| 33 | Ta2O5 | 34.279367 | Ta2O5 | 54.839717 | Nb2O5 | 30.870974 |
| 34 | SiO2 | 57.80494 | SiO2 | 78.482223 | SiO2 | 60.43428 |
| 35 | Ta2O5 | 35.60142 | Ta2O5 | 38.818646 | Nb2O5 | 35.537588 |
| 36 | SiO2 | 56.591019 | SiO2 | 46.407176 | SiO2 | 60.037206 |
| 37 | Ta2O5 | 33.656702 | Ta2O5 | 51.138684 | Nb2O5 | 36.374396 |
| 38 | SiO2 | 57.143868 | SiO2 | 82.982884 | SiO2 | 60.214403 |
| 39 | Ta2O5 | 35.719864 | Ta2O5 | 26.708898 | Nb2O5 | 34.3149 |
| 40 | SiO2 | 58.257933 | SiO2 | 51.859533 | SiO2 | 60.235292 |
| 41 | Ta2O5 | 36.531073 | Ta2O5 | 61.104302 | Nb2O5 | 33.271157 |
| 42 | SiO2 | 56.307264 | SiO2 | 108.277778 | SiO2 | 60.168732 |
| 43 | Ta2O5 | 32.680998 | | | Nb2O5 | 36.119813 |
| 44 | SiO2 | 50.733023 | | | SiO2 | 60.207085 |
| 45 | Ta2O5 | 28.023277 | | | Nb2O5 | 33.464954 |
| 46 | SiO2 | 51.196887 | | | SiO2 | 60.149693 |
| 47 | Ta2O5 | 19.142286 | | | Nb2O5 | 36.00308 |
| 48 | SiO2 | 50.629785 | | | SiO2 | 60.403769 |
| 49 | Ta2O5 | 26.716951 | | | Nb2O5 | 34.160149 |
| 50 | SiO2 | 55.850154 | | | SiO2 | 60.124751 |
| 51 | Ta2O5 | 29.863823 | | | Nb2O5 | 35.2811 |
| 52 | SiO2 | 55.110524 | | | SiO2 | 60.26672 |
| 53 | Ta2O5 | 35.894137 | | | Nb2O5 | 32.10233 |
| 54 | SiO2 | 47.843927 | | | SiO2 | 60.193407 |
| 55 | Ta2O5 | 37.041665 | | | Nb2O5 | 37.316571 |
| 56 | SiO2 | 45.381408 | | | SiO2 | 60.137124 |
| 57 | Ta2O5 | 29.600061 | | | Nb2O5 | 35.867151 |
| 58 | SiO2 | 40.860677 | | | SiO2 | 60.39107 |
| 59 | Ta2O5 | 29.372521 | | | Nb2O5 | 31.036834 |
| 60 | SiO2 | 46.399012 | | | SiO2 | 60.174082 |
| 61 | Ta2O5 | 22.842174 | | | Nb2O5 | 36.978492 |
| 62 | SiO2 | 49.815853 | | | SiO2 | 60.319609 |
| 63 | Ta2O5 | 36.274424 | | | Nb2O5 | 33.374732 |

TABLE 1-continued

| | Exciter Thickness (μm): 18.10235289 Total Layers: 252 | | Dichroic Thickness (μm): 4.30942641 Total Layers: 42 | | Emitter Thickness (μm): 15.30518641 Total Layers: 194 | |
|---|---|---|---|---|---|---|
| Layer | Material | Thickness (nm) | Material | Thickness (nm) | Material | Thickness (nm) |
| 64 | SiO2 | 54.324142 | | | SiO2 | 60.181133 |
| 65 | Ta2O5 | 40.458827 | | | Nb2O5 | 35.861868 |
| 66 | SiO2 | 75.141758 | | | SiO2 | 60.307815 |
| 67 | Ta2O5 | 54.975978 | | | Nb2O5 | 33.59944 |
| 68 | SiO2 | 80.679719 | | | SiO2 | 60.193744 |
| 69 | Ta2O5 | 54.217618 | | | Nb2O5 | 33.456941 |
| 70 | SiO2 | 78.526051 | | | SiO2 | 60.489912 |
| 71 | Ta2O5 | 55.168441 | | | Nb2O5 | 36.443989 |
| 72 | SiO2 | 71.834635 | | | SiO2 | 59.841639 |
| 73 | Ta2O5 | 48.329459 | | | Nb2O5 | 26.27951 |
| 74 | SiO2 | 72.58696 | | | SiO2 | 60.075569 |
| 75 | Ta2O5 | 43.503151 | | | Nb2O5 | 38.213174 |
| 76 | SiO2 | 73.635288 | | | SiO2 | 60.821373 |
| 77 | Ta2O5 | 49.566789 | | | Nb2O5 | 85.270905 |
| 78 | SiO2 | 72.455856 | | | SiO2 | 92.173209 |
| 79 | Ta2O5 | 51.439232 | | | Nb2O5 | 54.480764 |
| 80 | SiO2 | 75.609158 | | | SiO2 | 96.399518 |
| 81 | Ta2O5 | 52.108783 | | | Nb2O5 | 56.282028 |
| 82 | SiO2 | 71.153379 | | | SiO2 | 89.371698 |
| 83 | Ta2O5 | 53.7385 | | | Nb2O5 | 59.277907 |
| 84 | SiO2 | 73.672009 | | | SiO2 | 86.689226 |
| 85 | Ta2O5 | 48.097387 | | | Nb2O5 | 55.262139 |
| 86 | SiO2 | 75.728818 | | | SiO2 | 92.000607 |
| 87 | Ta2O5 | 48.340231 | | | Nb2O5 | 59.871431 |
| 88 | SiO2 | 73.564619 | | | SiO2 | 91.317968 |
| 89 | Ta2O5 | 50.903301 | | | Nb2O5 | 49.138615 |
| 90 | SiO2 | 74.184541 | | | SiO2 | 91.944998 |
| 91 | Ta2O5 | 45.757418 | | | Nb2O5 | 59.19566 |
| 92 | SiO2 | 71.307732 | | | SiO2 | 90.656734 |
| 93 | Ta2O5 | 52.953195 | | | Nb2O5 | 55.054019 |
| 94 | SiO2 | 75.18989 | | | SiO2 | 90.676684 |
| 95 | Ta2O5 | 51.368575 | | | Nb2O5 | 55.917677 |
| 96 | SiO2 | 70.218863 | | | SiO2 | 92.214702 |
| 97 | Ta2O5 | 50.998686 | | | Nb2O5 | 53.847302 |
| 98 | SiO2 | 77.100628 | | | SiO2 | 90.031406 |
| 99 | Ta2O5 | 49.206599 | | | Nb2O5 | 57.238435 |
| 100 | SiO2 | 72.037935 | | | SiO2 | 94.243958 |
| 101 | Ta2O5 | 47.827542 | | | Nb2O5 | 55.83927 |
| 102 | SiO2 | 75.489039 | | | SiO2 | 87.603422 |
| 103 | Ta2O5 | 47.501052 | | | Nb2O5 | 53.717509 |
| 104 | SiO2 | 75.590678 | | | SiO2 | 93.646056 |
| 105 | Ta2O5 | 54.441313 | | | Nb2O5 | 57.562274 |
| 106 | SiO2 | 72.561606 | | | SiO2 | 92.557977 |
| 107 | Ta2O5 | 46.160845 | | | Nb2O5 | 57.247855 |
| 108 | SiO2 | 75.730994 | | | SiO2 | 94.723869 |
| 109 | Ta2O5 | 49.702663 | | | Nb2O5 | 64.04146 |
| 110 | SiO2 | 73.981934 | | | SiO2 | 140.276505 |
| 111 | Ta2O5 | 49.986898 | | | Nb2O5 | 81.152058 |
| 112 | SiO2 | 74.587345 | | | SiO2 | 88.362474 |
| 113 | Ta2O5 | 45.299428 | | | Nb2O5 | 61.31521 |
| 114 | SiO2 | 75.231447 | | | SiO2 | 100.353597 |
| 115 | Ta2O5 | 54.377292 | | | Nb2O5 | 57.315144 |
| 116 | SiO2 | 74.795316 | | | SiO2 | 97.686937 |
| 117 | Ta2O5 | 46.568703 | | | Nb2O5 | 74.336194 |
| 118 | SiO2 | 74.454398 | | | SiO2 | 132.284981 |
| 119 | Ta2O5 | 51.044388 | | | Nb2O5 | 71.632993 |
| 120 | SiO2 | 75.266462 | | | SiO2 | 100.249233 |
| 121 | Ta2O5 | 47.624753 | | | Nb2O5 | 61.480426 |
| 122 | SiO2 | 72.993341 | | | SiO2 | 105.27203 |
| 123 | Ta2O5 | 47.964037 | | | Nb2O5 | 73.607006 |
| 124 | SiO2 | 74.330836 | | | SiO2 | 127.441961 |
| 125 | Ta2O5 | 54.166437 | | | Nb2O5 | 70.243021 |
| 126 | SiO2 | 78.83242 | | | SiO2 | 99.79181 |
| 127 | Ta2O5 | 46.652477 | | | Nb2O5 | 70.395986 |
| 128 | SiO2 | 69.698416 | | | SiO2 | 120.687337 |
| 129 | Ta2O5 | 49.419439 | | | Nb2O5 | 80.646146 |
| 130 | SiO2 | 74.878913 | | | SiO2 | 105.629715 |
| 131 | Ta2O5 | 48.650384 | | | Nb2O5 | 66.512313 |
| 132 | SiO2 | 77.469953 | | | SiO2 | 127.300651 |
| 133 | Ta2O5 | 53.886899 | | | Nb2O5 | 90.342434 |
| 134 | SiO2 | 78.690787 | | | SiO2 | 109.779167 |
| 135 | Ta2O5 | 58.564139 | | | Nb2O5 | 64.40587 |

TABLE 1-continued

| | Exciter Thickness (μm): 18.10235289 Total Layers: 252 | | Dichroic Thickness (μm): 4.30942641 Total Layers: 42 | | Emitter Thickness (μm): 15.30518641 Total Layers: 194 | |
|---|---|---|---|---|---|---|
| Layer | Material | Thickness (nm) | Material | Thickness (nm) | Material | Thickness (nm) |
| 136 | SiO2 | 80.162979 | | | SiO2 | 99.077318 |
| 137 | Ta2O5 | 71.78323 | | | Nb2O5 | 68.822795 |
| 138 | SiO2 | 86.102169 | | | SiO2 | 134.415894 |
| 139 | Ta2O5 | 55.204927 | | | Nb2O5 | 81.319024 |
| 140 | SiO2 | 87.572558 | | | SiO2 | 102.463352 |
| 141 | Ta2O5 | 50.601814 | | | Nb2O5 | 67.198258 |
| 142 | SiO2 | 68.136137 | | | SiO2 | 123.365193 |
| 143 | Ta2O5 | 50.349154 | | | Nb2O5 | 87.583061 |
| 144 | SiO2 | 86.178214 | | | SiO2 | 121.883831 |
| 145 | Ta2O5 | 58.186181 | | | Nb2O5 | 75.342968 |
| 146 | SiO2 | 73.681454 | | | SiO2 | 133.570567 |
| 147 | Ta2O5 | 70.259044 | | | Nb2O5 | 82.365214 |
| 148 | SiO2 | 98.260809 | | | SiO2 | 102.90187 |
| 149 | Ta2O5 | 56.657859 | | | Nb2O5 | 87.2159 |
| 150 | SiO2 | 79.960814 | | | SiO2 | 168.316217 |
| 151 | Ta2O5 | 61.9969 | | | Nb2O5 | 86.089948 |
| 152 | SiO2 | 85.68654 | | | SiO2 | 143.549416 |
| 153 | Ta2O5 | 58.487597 | | | Nb2O5 | 81.55587 |
| 154 | SiO2 | 78.844243 | | | SiO2 | 119.358623 |
| 155 | Ta2O5 | 70.784963 | | | Nb2O5 | 87.987123 |
| 156 | SiO2 | 89.081327 | | | SiO2 | 150.803977 |
| 157 | Ta2O5 | 56.026038 | | | Nb2O5 | 90.977229 |
| 158 | SiO2 | 83.635559 | | | SiO2 | 156.064747 |
| 159 | Ta2O5 | 65.467321 | | | Nb2O5 | 90.759677 |
| 160 | SiO2 | 89.225853 | | | SiO2 | 135.613339 |
| 161 | Ta2O5 | 71.020416 | | | Nb2O5 | 78.077551 |
| 162 | SiO2 | 89.115342 | | | SiO2 | 125.232036 |
| 163 | Ta2O5 | 64.229848 | | | Nb2O5 | 83.932929 |
| 164 | SiO2 | 88.504899 | | | SiO2 | 148.934923 |
| 165 | Ta2O5 | 56.637385 | | | Nb2O5 | 95.680094 |
| 166 | SiO2 | 86.461303 | | | SiO2 | 148.743293 |
| 167 | Ta2O5 | 59.587057 | | | Nb2O5 | 87.985304 |
| 168 | SiO2 | 90.374743 | | | SiO2 | 151.172071 |
| 169 | Ta2O5 | 62.67727 | | | Nb2O5 | 94.80538 |
| 170 | SiO2 | 97.243763 | | | SiO2 | 155.204918 |
| 171 | Ta2O5 | 65.378098 | | | Nb2O5 | 90.204983 |
| 172 | SiO2 | 93.196831 | | | SiO2 | 132.993524 |
| 173 | Ta2O5 | 74.062652 | | | Nb2O5 | 81.763033 |
| 174 | SiO2 | 95.769772 | | | SiO2 | 147.14212 |
| 175 | Ta2O5 | 63.635611 | | | Nb2O5 | 103.569699 |
| 176 | SiO2 | 95.215149 | | | SiO2 | 161.029059 |
| 177 | Ta2O5 | 59.20011 | | | Nb2O5 | 99.402575 |
| 178 | SiO2 | 98.399319 | | | SiO2 | 154.260901 |
| 179 | Ta2O5 | 74.275704 | | | Nb2O5 | 102.986509 |
| 180 | SiO2 | 101.091627 | | | SiO2 | 165.499705 |
| 181 | Ta2O5 | 69.877353 | | | Nb2O5 | 111.317219 |
| 182 | SiO2 | 106.71887 | | | SiO2 | 167.574838 |
| 183 | Ta2O5 | 71.073631 | | | Nb2O5 | 115.804816 |
| 184 | SiO2 | 104.115398 | | | SiO2 | 166.510097 |
| 185 | Ta2O5 | 69.662266 | | | Nb2O5 | 112.668699 |
| 186 | SiO2 | 100.11951 | | | SiO2 | 162.864546 |
| 187 | Ta2O5 | 69.377336 | | | Nb2O5 | 103.082378 |
| 188 | SiO2 | 104.399829 | | | SiO2 | 153.116153 |
| 189 | Ta2O5 | 75.096851 | | | Nb2O5 | 108.040025 |
| 190 | SiO2 | 105.517552 | | | SiO2 | 164.27813 |
| 191 | Ta2O5 | 70.843547 | | | Nb2O5 | 114.895638 |
| 192 | SiO2 | 111.700199 | | | SiO2 | 162.726583 |
| 193 | Ta2O5 | 76.455848 | | | Nb2O5 | 111.21254 |
| 194 | SiO2 | 100.059876 | | | SiO2 | 78.946972 |
| 195 | Ta2O5 | 73.523768 | | | | |
| 196 | SiO2 | 104.669083 | | | | |
| 197 | Ta2O5 | 63.613775 | | | | |
| 198 | SiO2 | 120.318062 | | | | |
| 199 | Ta2O5 | 89.34781 | | | | |
| 200 | SiO2 | 110.531615 | | | | |
| 201 | Ta2O5 | 74.655493 | | | | |
| 202 | SiO2 | 109.966102 | | | | |
| 203 | Ta2O5 | 73.48166 | | | | |
| 204 | SiO2 | 119.086024 | | | | |
| 205 | Ta2O5 | 83.73169 | | | | |
| 206 | SiO2 | 100.309196 | | | | |
| 207 | Ta2O5 | 75.324665 | | | | |

TABLE 1-continued

| | Exciter Thickness (μm): 18.10235289 Total Layers: 252 | | Dichroic Thickness (μm): 4.30942641 Total Layers: 42 | | Emitter Thickness (μm): 15.30518641 Total Layers: 194 | |
|---|---|---|---|---|---|---|
| Layer | Material | Thickness (nm) | Material | Thickness (nm) | Material | Thickness (nm) |
| 208 | SiO2 | 97.320858 | | | | |
| 209 | Ta2O5 | 69.045354 | | | | |
| 210 | SiO2 | 107.551845 | | | | |
| 211 | Ta2O5 | 91.440427 | | | | |
| 212 | SiO2 | 119.775905 | | | | |
| 213 | Ta2O5 | 66.670026 | | | | |
| 214 | SiO2 | 118.637034 | | | | |
| 215 | Ta2O5 | 79.590138 | | | | |
| 216 | SiO2 | 129.284989 | | | | |
| 217 | Ta2O5 | 96.234672 | | | | |
| 218 | SiO2 | 125.081023 | | | | |
| 219 | Ta2O5 | 82.820693 | | | | |
| 220 | SiO2 | 129.361088 | | | | |
| 221 | Ta2O5 | 73.167236 | | | | |
| 222 | SiO2 | 122.415306 | | | | |
| 223 | Ta2O5 | 86.141677 | | | | |
| 224 | SiO2 | 137.47071 | | | | |
| 225 | Ta2O5 | 91.663801 | | | | |
| 226 | SiO2 | 123.466319 | | | | |
| 227 | Ta2O5 | 88.789668 | | | | |
| 228 | SiO2 | 142.853947 | | | | |
| 229 | Ta2O5 | 82.699299 | | | | |
| 230 | SiO2 | 112.973376 | | | | |
| 231 | Ta2O5 | 75.808449 | | | | |
| 232 | SiO2 | 116.289632 | | | | |
| 233 | Ta2O5 | 103.393429 | | | | |
| 234 | SiO2 | 131.623678 | | | | |
| 235 | Ta2O5 | 135.874235 | | | | |
| 236 | SiO2 | 139.086712 | | | | |
| 237 | Ta2O5 | 110.938326 | | | | |
| 238 | SiO2 | 148.137695 | | | | |
| 239 | Ta2O5 | 119.290778 | | | | |
| 240 | SiO2 | 148.727869 | | | | |
| 241 | Ta2O5 | 109.294552 | | | | |
| 242 | SiO2 | 158.719661 | | | | |
| 243 | Ta2O5 | 104.603832 | | | | |
| 244 | SiO2 | 153.67652 | | | | |
| 245 | Ta2O5 | 114.623631 | | | | |
| 246 | SiO2 | 152.308865 | | | | |
| 247 | Ta2O5 | 102.906211 | | | | |
| 248 | SiO2 | 160.394283 | | | | |
| 249 | Ta2O5 | 100.052054 | | | | |
| 250 | SiO2 | 154.428969 | | | | |
| 251 | Ta2O5 | 99.935121 | | | | |
| 252 | SiO2 | 69.518357 | | | | |

TABLE 2

| | Exciter Thickness (μm): 15.46312828 Total Layers: 195 | | Dichroic Thickness (μm): 4.78682926 Total Layers: 32 | | Emitter Thickness (μm): 16.51720336 Total Layers: 199 | |
|---|---|---|---|---|---|---|
| Layer | Material | Thickness (nm) | Material | Thickness (nm) | Material | Thickness (nm) |
| 1 | Nb2O5 | 103.020435 | Nb2O5 | 19.755258 | Nb2O5 | 120.520412 |
| 2 | SiO2 | 184.969867 | SiO2 | 249.436778 | SiO2 | 208.471674 |
| 3 | Nb2O5 | 105.65992 | Nb2O5 | 102.667383 | Nb2O5 | 98.844384 |
| 4 | SiO2 | 177.696611 | SiO2 | 226.406451 | SiO2 | 149.332901 |
| 5 | Nb2O5 | 111.787595 | Nb2O5 | 53.47712 | Nb2O5 | 98.279852 |
| 6 | SiO2 | 166.111328 | SiO2 | 240.811076 | SiO2 | 162.657065 |
| 7 | Nb2O5 | 175.482955 | Nb2O5 | 70.760978 | Nb2O5 | 111.307612 |
| 8 | SiO2 | 152.596466 | SiO2 | 232.649733 | SiO2 | 182.747042 |
| 9 | Nb2O5 | 99.839977 | Nb2O5 | 74.140776 | Nb2O5 | 101.10863 |
| 10 | SiO2 | 162.547624 | SiO2 | 231.888658 | SiO2 | 165.814661 |
| 11 | Nb2O5 | 117.107037 | Nb2O5 | 77.34542 | Nb2O5 | 107.951598 |
| 12 | SiO2 | 166.03817 | SiO2 | 230.346511 | SiO2 | 165.702027 |
| 13 | Nb2O5 | 105.336144 | Nb2O5 | 77.00804 | Nb2O5 | 110.77163 |
| 14 | SiO2 | 168.556027 | SiO2 | 230.522453 | SiO2 | 164.502195 |

TABLE 2-continued

| | Exciter Thickness (μm): 15.46312828 Total Layers: 195 | | Dichroic Thickness (μm): 4.78682926 Total Layers: 32 | | Emitter Thickness (μm): 16.51720336 Total Layers: 199 | |
|---|---|---|---|---|---|---|
| Layer | Material | Thickness (nm) | Material | Thickness (nm) | Material | Thickness (nm) |
| 15 | Nb2O5 | 105.872654 | Nb2O5 | 75.358277 | Nb2O5 | 104.819083 |
| 16 | SiO2 | 160.59604 | SiO2 | 232.094873 | SiO2 | 173.543722 |
| 17 | Nb2O5 | 101.415851 | Nb2O5 | 75.480988 | Nb2O5 | 93.246141 |
| 18 | SiO2 | 162.822862 | SiO2 | 231.775947 | SiO2 | 166.941351 |
| 19 | Nb2O5 | 100.420397 | Nb2O5 | 77.171654 | Nb2O5 | 110.454611 |
| 20 | SiO2 | 154.47743 | SiO2 | 231.110905 | SiO2 | 156.201891 |
| 21 | Nb2O5 | 88.909405 | Nb2O5 | 76.930145 | Nb2O5 | 118.86173 |
| 22 | SiO2 | 130.390877 | SiO2 | 231.405803 | SiO2 | 168.680866 |
| 23 | Nb2O5 | 81.697069 | Nb2O5 | 75.551257 | Nb2O5 | 68.573262 |
| 24 | SiO2 | 141.646947 | SiO2 | 230.497556 | SiO2 | 152.615185 |
| 25 | Nb2O5 | 82.555605 | Nb2O5 | 75.62217 | Nb2O5 | 77.401487 |
| 26 | SiO2 | 145.341923 | SiO2 | 233.252254 | SiO2 | 149.403322 |
| 27 | Nb2O5 | 114.93102 | Nb2O5 | 70.037093 | Nb2O5 | 76.636857 |
| 28 | SiO2 | 154.548707 | SiO2 | 252.562806 | SiO2 | 155.659656 |
| 29 | Nb2O5 | 94.476203 | Nb2O5 | 47.366784 | Nb2O5 | 126.190604 |
| 30 | SiO2 | 136.529517 | SiO2 | 264.999891 | SiO2 | 177.406209 |
| 31 | Nb2O5 | 66.101724 | Nb2O5 | 44.978082 | Nb2O5 | 118.182198 |
| 32 | SiO2 | 119.076319 | SiO2 | 143.416145 | SiO2 | 134.96742 |
| 33 | Nb2O5 | 79.729322 | | | Nb2O5 | 82.964814 |
| 34 | SiO2 | 130.874119 | | | SiO2 | 134.253757 |
| 35 | Nb2O5 | 77.992525 | | | Nb2O5 | 99.632888 |
| 36 | SiO2 | 107.485394 | | | SiO2 | 136.967071 |
| 37 | Nb2O5 | 65.800567 | | | Nb2O5 | 84.309472 |
| 38 | SiO2 | 128.134247 | | | SiO2 | 125.187075 |
| 39 | Nb2O5 | 90.910325 | | | Nb2O5 | 91.372536 |
| 40 | SiO2 | 130.795882 | | | SiO2 | 151.253421 |
| 41 | Nb2O5 | 77.295454 | | | Nb2O5 | 77.281077 |
| 42 | SiO2 | 112.503147 | | | SiO2 | 123.411921 |
| 43 | Nb2O5 | 84.909856 | | | Nb2O5 | 87.053171 |
| 44 | SiO2 | 120.81689 | | | SiO2 | 157.742993 |
| 45 | Nb2O5 | 59.418177 | | | Nb2O5 | 90.646247 |
| 46 | SiO2 | 112.953288 | | | SiO2 | 123.049582 |
| 47 | Nb2O5 | 61.10262 | | | Nb2O5 | 76.703209 |
| 48 | SiO2 | 111.503659 | | | SiO2 | 116.839938 |
| 49 | Nb2O5 | 65.958775 | | | Nb2O5 | 80.310636 |
| 50 | SiO2 | 127.125449 | | | SiO2 | 153.946123 |
| 51 | Nb2O5 | 85.430322 | | | Nb2O5 | 78.805046 |
| 52 | SiO2 | 112.775188 | | | SiO2 | 117.543485 |
| 53 | Nb2O5 | 56.630195 | | | Nb2O5 | 79.153398 |
| 54 | SiO2 | 105.40047 | | | SiO2 | 118.904155 |
| 55 | Nb2O5 | 78.765413 | | | Nb2O5 | 95.762182 |
| 56 | SiO2 | 110.84542 | | | SiO2 | 149.672109 |
| 57 | Nb2O5 | 95.071038 | | | Nb2O5 | 81.465016 |
| 58 | SiO2 | 113.979483 | | | SiO2 | 115.576654 |
| 59 | Nb2O5 | 54.909864 | | | Nb2O5 | 73.183432 |
| 60 | SiO2 | 109.144907 | | | SiO2 | 115.54896 |
| 61 | Nb2O5 | 61.138387 | | | Nb2O5 | 90.276731 |
| 62 | SiO2 | 101.5793 | | | SiO2 | 157.761513 |
| 63 | Nb2O5 | 63.953512 | | | Nb2O5 | 76.449894 |
| 64 | SiO2 | 115.694758 | | | SiO2 | 110.97485 |
| 65 | Nb2O5 | 92.745136 | | | Nb2O5 | 66.878672 |
| 66 | SiO2 | 117.584656 | | | SiO2 | 109.007813 |
| 67 | Nb2O5 | 65.394942 | | | Nb2O5 | 76.535182 |
| 68 | SiO2 | 97.007268 | | | SiO2 | 101.204588 |
| 69 | Nb2O5 | 63.950919 | | | Nb2O5 | 73.043965 |
| 70 | SiO2 | 99.003518 | | | SiO2 | 63.705658 |
| 71 | Nb2O5 | 53.62224 | | | Nb2O5 | 80.258136 |
| 72 | SiO2 | 98.115648 | | | SiO2 | 103.316583 |
| 73 | Nb2O5 | 60.656343 | | | Nb2O5 | 69.991268 |
| 74 | SiO2 | 89.521684 | | | SiO2 | 105.298699 |
| 75 | Nb2O5 | 63.642403 | | | Nb2O5 | 60.098474 |
| 76 | SiO2 | 95.056625 | | | SiO2 | 107.357243 |
| 77 | Nb2O5 | 58.955796 | | | Nb2O5 | 72.011096 |
| 78 | SiO2 | 94.019429 | | | SiO2 | 101.801649 |
| 79 | Nb2O5 | 59.79292 | | | Nb2O5 | 68.272344 |
| 80 | SiO2 | 95.337034 | | | SiO2 | 106.96859 |
| 81 | Nb2O5 | 58.781 | | | Nb2O5 | 72.521376 |
| 82 | SiO2 | 92.690163 | | | SiO2 | 89.234517 |
| 83 | Nb2O5 | 62.99268 | | | Nb2O5 | 58.598235 |
| 84 | SiO2 | 94.153333 | | | SiO2 | 115.600753 |
| 85 | Nb2O5 | 55.447279 | | | Nb2O5 | 69.202224 |
| 86 | SiO2 | 98.487741 | | | SiO2 | 107.014337 |

TABLE 2-continued

| | Exciter Thickness (μm): 15.46312828 Total Layers: 195 | | Dichroic Thickness (μm): 4.78682926 Total Layers: 32 | | Emitter Thickness (μm): 16.51720336 Total Layers: 199 | |
|---|---|---|---|---|---|---|
| Layer | Material | Thickness (nm) | Material | Thickness (nm) | Material | Thickness (nm) |
| 87 | Nb2O5 | 60.725646 | | | Nb2O5 | 72.455308 |
| 88 | SiO2 | 89.544252 | | | SiO2 | 97.342236 |
| 89 | Nb2O5 | 63.601086 | | | Nb2O5 | 63.113257 |
| 90 | SiO2 | 100.274483 | | | SiO2 | 135.724689 |
| 91 | Nb2O5 | 52.206565 | | | Nb2O5 | 46.793414 |
| 92 | SiO2 | 87.663852 | | | SiO2 | 72.010233 |
| 93 | Nb2O5 | 64.740092 | | | Nb2O5 | 80.56155 |
| 94 | SiO2 | 101.752041 | | | SiO2 | 123.411312 |
| 95 | Nb2O5 | 55.720872 | | | Nb2O5 | 76.424644 |
| 96 | SiO2 | 96.903455 | | | SiO2 | 64.204657 |
| 97 | Nb2O5 | 56.692561 | | | Nb2O5 | 102.34953 |
| 98 | SiO2 | 91.511539 | | | SiO2 | 71.179041 |
| 99 | Nb2O5 | 61.22283 | | | Nb2O5 | 57.076149 |
| 100 | SiO2 | 96.596527 | | | SiO2 | 72.559939 |
| 101 | Nb2O5 | 62.779161 | | | Nb2O5 | 33.97113 |
| 102 | SiO2 | 89.93581 | | | SiO2 | 72.734555 |
| 103 | Nb2O5 | 62.534761 | | | Nb2O5 | 39.740447 |
| 104 | SiO2 | 92.739907 | | | SiO2 | 73.051133 |
| 105 | Nb2O5 | 54.171416 | | | Nb2O5 | 45.354032 |
| 106 | SiO2 | 96.849103 | | | SiO2 | 74.135476 |
| 107 | Nb2O5 | 63.939278 | | | Nb2O5 | 49.428548 |
| 108 | SiO2 | 80.191432 | | | SiO2 | 73.556512 |
| 109 | Nb2O5 | 65.397114 | | | Nb2O5 | 45.257904 |
| 110 | SiO2 | 105.817135 | | | SiO2 | 74.133337 |
| 111 | Nb2O5 | 60.031711 | | | Nb2O5 | 49.200523 |
| 112 | SiO2 | 75.121866 | | | SiO2 | 73.628251 |
| 113 | Nb2O5 | 59.984846 | | | Nb2O5 | 39.769374 |
| 114 | SiO2 | 103.875707 | | | SiO2 | 73.346996 |
| 115 | Nb2O5 | 59.988706 | | | Nb2O5 | 49.874938 |
| 116 | SiO2 | 90.589629 | | | SiO2 | 72.872096 |
| 117 | Nb2O5 | 53.800292 | | | Nb2O5 | 46.727442 |
| 118 | SiO2 | 96.321289 | | | SiO2 | 72.439376 |
| 119 | Nb2O5 | 77.09225 | | | Nb2O5 | 46.257557 |
| 120 | SiO2 | 73.185234 | | | SiO2 | 73.803087 |
| 121 | Nb2O5 | 61.726588 | | | Nb2O5 | 49.63358 |
| 122 | SiO2 | 110.071331 | | | SiO2 | 73.440207 |
| 123 | Nb2O5 | 58.450469 | | | Nb2O5 | 42.555636 |
| 124 | SiO2 | 52.926246 | | | SiO2 | 73.900884 |
| 125 | Nb2O5 | 81.093005 | | | Nb2O5 | 48.92588 |
| 126 | SiO2 | 39.60735 | | | SiO2 | 73.476829 |
| 127 | Nb2O5 | 30.972587 | | | Nb2O5 | 45.373354 |
| 128 | SiO2 | 63.717129 | | | SiO2 | 74.350068 |
| 129 | Nb2O5 | 28.812372 | | | Nb2O5 | 45.205053 |
| 130 | SiO2 | 65.726825 | | | SiO2 | 75.271069 |
| 131 | Nb2O5 | 51.930921 | | | Nb2O5 | 47.340812 |
| 132 | SiO2 | 62.658775 | | | SiO2 | 75.510507 |
| 133 | Nb2O5 | 44.689331 | | | Nb2O5 | 45.316969 |
| 134 | SiO2 | 61.304026 | | | SiO2 | 74.669696 |
| 135 | Nb2O5 | 38.032444 | | | Nb2O5 | 46.348844 |
| 136 | SiO2 | 60.894131 | | | SiO2 | 73.954689 |
| 137 | Nb2O5 | 49.786027 | | | Nb2O5 | 47.590089 |
| 138 | SiO2 | 63.123868 | | | SiO2 | 73.988145 |
| 139 | Nb2O5 | 36.831253 | | | Nb2O5 | 41.787049 |
| 140 | SiO2 | 65.654231 | | | SiO2 | 73.831633 |
| 141 | Nb2O5 | 37.365471 | | | Nb2O5 | 49.757488 |
| 142 | SiO2 | 65.629594 | | | SiO2 | 73.720914 |
| 143 | Nb2O5 | 44.090334 | | | Nb2O5 | 48.296369 |
| 144 | SiO2 | 65.669747 | | | SiO2 | 73.061434 |
| 145 | Nb2O5 | 40.460522 | | | Nb2O5 | 45.376895 |
| 146 | SiO2 | 65.039624 | | | SiO2 | 73.641224 |
| 147 | Nb2O5 | 43.94835 | | | Nb2O5 | 47.904826 |
| 148 | SiO2 | 64.973048 | | | SiO2 | 74.358153 |
| 149 | Nb2O5 | 39.135381 | | | Nb2O5 | 43.689922 |
| 150 | SiO2 | 65.675389 | | | SiO2 | 74.667973 |
| 151 | Nb2O5 | 35.757871 | | | Nb2O5 | 48.432513 |
| 152 | SiO2 | 65.175315 | | | SiO2 | 74.459908 |
| 153 | Nb2O5 | 45.600403 | | | Nb2O5 | 43.394492 |
| 154 | SiO2 | 65.847471 | | | SiO2 | 73.891471 |
| 155 | Nb2O5 | 41.851528 | | | Nb2O5 | 47.151012 |
| 156 | SiO2 | 65.7225 | | | SiO2 | 73.265274 |
| 157 | Nb2O5 | 37.057438 | | | Nb2O5 | 47.944367 |
| 158 | SiO2 | 66.186088 | | | SiO2 | 72.970548 |

TABLE 2-continued

| | Exciter Thickness (μm): 15.46312828 Total Layers: 195 | | Dichroic Thickness (μm): 4.78682926 Total Layers: 32 | | Emitter Thickness (μm): 16.51720336 Total Layers: 199 | |
|---|---|---|---|---|---|---|
| Layer | Material | Thickness (nm) | Material | Thickness (nm) | Material | Thickness (nm) |
| 159 | Nb2O5 | 41.607851 | | | Nb2O5 | 50.739433 |
| 160 | SiO2 | 65.499169 | | | SiO2 | 73.294839 |
| 161 | Nb2O5 | 43.656602 | | | Nb2O5 | 43.792746 |
| 162 | SiO2 | 64.882681 | | | SiO2 | 74.191749 |
| 163 | Nb2O5 | 34.963028 | | | Nb2O5 | 42.503653 |
| 164 | SiO2 | 65.276026 | | | SiO2 | 73.823048 |
| 165 | Nb2O5 | 42.46295 | | | Nb2O5 | 50.548065 |
| 166 | SiO2 | 66.08707 | | | SiO2 | 72.500106 |
| 167 | Nb2O5 | 45.406729 | | | Nb2O5 | 44.227006 |
| 168 | SiO2 | 65.656958 | | | SiO2 | 72.028742 |
| 169 | Nb2O5 | 39.090325 | | | Nb2O5 | 52.30712 |
| 170 | SiO2 | 64.649759 | | | SiO2 | 72.564394 |
| 171 | Nb2O5 | 35.493024 | | | Nb2O5 | 43.051055 |
| 172 | SiO2 | 65.234651 | | | SiO2 | 73.124878 |
| 173 | Nb2O5 | 43.949858 | | | Nb2O5 | 50.009649 |
| 174 | SiO2 | 65.772432 | | | SiO2 | 72.960645 |
| 175 | Nb2O5 | 40.226738 | | | Nb2O5 | 43.067512 |
| 176 | SiO2 | 66.337577 | | | SiO2 | 72.434957 |
| 177 | Nb2O5 | 40.886654 | | | Nb2O5 | 42.759632 |
| 178 | SiO2 | 65.82086 | | | SiO2 | 72.609111 |
| 179 | Nb2O5 | 38.368344 | | | Nb2O5 | 51.113242 |
| 180 | SiO2 | 64.442884 | | | SiO2 | 72.310448 |
| 181 | Nb2O5 | 43.148079 | | | Nb2O5 | 49.032682 |
| 182 | SiO2 | 60.270591 | | | SiO2 | 73.161244 |
| 183 | Nb2O5 | 36.174955 | | | Nb2O5 | 38.189301 |
| 184 | SiO2 | 60.597924 | | | SiO2 | 71.289535 |
| 185 | Nb2O5 | 42.938963 | | | Nb2O5 | 40.751881 |
| 186 | SiO2 | 62.107829 | | | SiO2 | 72.554329 |
| 187 | Nb2O5 | 43.297542 | | | Nb2O5 | 44.046474 |
| 188 | SiO2 | 63.033125 | | | SiO2 | 71.462947 |
| 189 | Nb2O5 | 18.612166 | | | Nb2O5 | 27.650176 |
| 190 | SiO2 | 59.632382 | | | SiO2 | 69.256787 |
| 191 | Nb2O5 | 39.684558 | | | Nb2O5 | 37.674692 |
| 192 | SiO2 | 62.537565 | | | SiO2 | 67.540846 |
| 193 | Nb2O5 | 28.592641 | | | Nb2O5 | 31.042601 |
| 194 | SiO2 | 47.574953 | | | SiO2 | 57.342841 |
| 195 | Nb2O5 | 26.307995 | | | Nb2O5 | 49.926189 |
| 196 | | | | | SiO2 | 62.411325 |
| 197 | | | | | Nb2O5 | 43.555442 |
| 198 | | | | | SiO2 | 60.999258 |
| 199 | | | | | Nb2O5 | 20.686301 |

What is claimed is:

1. An optical device, comprising:
a substrate having a surface; and
a plurality of layers provided on the surface of the substrate, the plurality of layers including alternating first and second layers, the first layers having a first refractive index, $n_L$, and the second layers having a second refractive index, $n_H$, greater than the first refractive index,
wherein the plurality of layers has a spectral characteristic, the spectral characteristic having a passband, which is defined by a first passband wavelength $\lambda_{1passband}$ and a second passband wavelength $\lambda_{2passband}$, the spectral characteristic having a center wavelength between $\lambda_{1passband}$ and $\lambda_{2passband}$ and having an average transmissivity at least equal to 80% over the passband,
the spectral characteristic having an average optical density greater than 4 over at least one of first and second blocking bands of wavelengths, wherein the first blocking band of wavelengths extends from a first blocking wavelength, $\lambda_{1block}$, having an associated optical density equal to 4 to a second blocking wavelength, $\lambda_{2block}$, the second blocking wavelength satisfying:

$$\lambda_{2block} < 0.9 * ((1-x)/(1+x)) * \lambda_{1block},$$

wherein the second blocking band of wavelengths extends from a third blocking wavelength, $\lambda_{3block}$, having an associated optical density equal to 4 to a fourth blocking wavelength, $\lambda_{4block}$, the fourth blocking wavelength satisfying:

$$\lambda_{4block} > 1.1 * ((1+x)/(1-x)) * \lambda_{3block},$$

where $$x = \frac{2}{\pi} \arcsin\left(\frac{n_H - n_L}{n_H + n_L}\right),$$

wherein a first edge band of wavelengths is associated with a first edge portion of the spectral characteristic adjacent the passband, the first edge band of wavelengths extending from $\lambda_{1passband}$ to $\lambda_{1block}$, such that, at a first transmission wavelength, $\lambda_{1-50\%}$, within the first edge band of wavelengths, the coating has a transmissivity of 50%, $\lambda_{1passband}$, $\lambda_{1block}$, and $\lambda_{1-50\%}$, satisfy:

$$(\lambda_{1passband} - \lambda_{1block})/\lambda_{1-50\%} < 2\%, \text{ and}$$

wherein a second edge band of wavelengths is associated with a second edge portion of the spectral characteristic adjacent the passband, the second edge band of wavelengths extending from $\lambda_{2passband}$ to $\lambda_{3block}$, such that, at a second transmission wavelength, $\lambda_{2\text{-}50\%}$, within the second edge band of wavelengths, the plurality of layers has a transmissivity of 50%, $\lambda_{2passband}$, $\lambda_{3block}$, and $\lambda_{2\text{-}50\%}$, satisfy:

$(\lambda_{3block} - \lambda_{2passband})/\lambda_{2\text{-}50\%} < 2\%$, and a minimum spectral distance between $\lambda_{1block}$ and $\lambda_{3block}$ is greater than 2% of the center wavelength.

2. An optical device in accordance with claim 1, wherein the plurality of layers includes a plurality of hard-coating layers.

3. An optical device in accordance with claim 2, wherein the spectral characteristic has an average optical density greater than 5 over at least one of the first and second blocking bands of wavelengths.

4. An optical device in accordance with claim 2, wherein $\lambda_{4block}$ is between 700 nm to 900 nm, and the spectral characteristic has an average OD greater than 2 over a band of wavelengths extending from $\lambda_{4block}$ to wavelength greater than 1000 nm.

5. An optical device in accordance with claim 2, wherein the center wavelength is within 380 nm to 700 nm.

6. An optical device in accordance with claim 2, wherein the spectral distance between $\lambda_{1block}$ and $\lambda_{3block}$ is between 10 nm and 80 nm.

7. An optical device in accordance with claim 2, wherein the plurality of hard coating layers includes two or more of: $SiO_2$, $Ta_2O_5$, $Nb_2O_5$, $HfO_2$, $TiO_2$, and $Al_2O_5$.

8. An optical device in accordance with claim 2, wherein the substrate includes one of a float glass and an optical glass.

9. An optical device in accordance with claim 2, wherein the surface of the substrate is a first surface of the substrate, the substrate further comprising a second surface opposite the first surface, the optical device further comprising:

an anti-reflection coating provided on the second surface of the substrate, the anti-reflection coating substantially preventing reflection of light having a wavelength within the passband.

10. An optical device in accordance with claim 2, wherein the substrate is a first substrate, the plurality of layers is a first plurality of layers, the spectral characteristic is a first spectral characteristic, the passband is a first passband, and the center wavelength is a first center wavelength, the optical device further comprising:

a second substrate;

a second plurality of layers provided on the second substrate, the second plurality of layers being configured to reflect first light at a first wavelength, the first wavelength being within said first passband;

a third substrate having a surface;

a third plurality of layers provided on the surface of the third substrate, the third plurality of layers including alternating third and fourth layers, the third layers having a refractive index, $n_{L2}$, and the fourth layers having a refractive index, $n_{H2}$, greater than $n_{L2}$, wherein the third plurality of layers has a second spectral characteristic, the second spectral characteristic having a second passband, which is defined by passband wavelengths $\lambda_{1\text{-}2passband}$ and $\lambda_{2\text{-}2passband}$, the second spectral characteristic having an average transmissivity at least equal to 80% over the second passband, and the second passband having a second center wavelength between $\lambda_{1\text{-}2passband}$ and $\lambda_{2\text{-}2passband}$, the second spectral characteristic having an average optical density greater than 4 over at least one of a lower blocking band of wavelengths and an upper blocking band of wavelengths, the lower blocking band of wavelengths extends from wavelength $\lambda_{1\text{-}2block}$, which has an associated optical density equal to 4, to wavelength $\lambda_{2\text{-}2block}$, $\lambda_{2\text{-}2block}$ satisfying:

$\lambda_{2\text{-}2block} < 0.9 \ast ((1-x_2)/(1+x_2)) \ast \lambda_{1\text{-}2block}$, wherein the upper blocking band of wavelengths extends from wavelength $\lambda_{3\text{-}2block}$, which has an associated optical density equal to 4, to wavelength $\lambda_{4\text{-}2block}$, $\lambda_{4\text{-}2block}$ satisfying:

$\lambda_{4\text{-}2block} > 1.1 \ast ((1+x_2)/(1-x_2)) \ast \lambda_{3\text{-}2block}$, where $$x_2 = \frac{2}{\pi} \arcsin\left(\frac{n_{H2} - n_{L2}}{n_{H2} + n_{L2}}\right),$$

wherein a lower edge band of wavelengths is associated with a lower edge portion of the spectral characteristic adjacent the second passband, the lower edge band of wavelengths extending from $\lambda_{1\text{-}2passband}$ to $\lambda_{1\text{-}2block}$, such that, at wavelength $\lambda_{1\text{-}2\text{-}50\%}$, within the lower edge band of wavelengths, the second coating has a transmissivity of 50%, $\lambda_{1\text{-}2passband}$, $\lambda_{1\text{-}2block}$, and $\lambda_{1\text{-}2\text{-}50\%}$, satisfy:

$(\lambda_{1\text{-}2passband} - \lambda_{1\text{-}2block})/\lambda_{1\text{-}2\text{-}50\%} < 2\%$, wherein an upper edge band of wavelengths is associated with an upper edge portion of the second spectral characteristic adjacent the second passband, the upper edge band of wavelengths extending from $\lambda_{2\text{-}2passband}$ to $\lambda_{3\text{-}2block}$, such that, at wavelength, $\lambda_{2\text{-}2\text{-}50\%}$, within the upper edge band of wavelengths, the second coating has a transmissivity of 50%, $\lambda_{2\text{-}2passband}$, $\lambda_{3\text{-}2block}$, and $\lambda_{2\text{-}2\text{-}50\%}$, satisfy:

$(\lambda_{3\text{-}2block} - \lambda_{2\text{-}2passband})/\lambda_{2\text{-}2\text{-}50\%} < 2\%$, and wherein the first wavelength is within the lower blocking band of wavelengths, the third plurality of layers being configured to pass second light having a second wavelength, the second wavelength being within the second blocking band of wavelengths, the second plurality of layers being configured to pass third light, the third light having a third wavelength, which is within the second passband, and a minimum spectral distance between $\lambda_{1\text{-}2block}$ and $\lambda_{3\text{-}2block}$ is greater than 2% of the second center wavelength.

11. An optical device in accordance with claim 2, wherein the substrate is a first substrate, the plurality of layers is a first plurality of layers, the spectral characteristic is a first spectral characteristic, the passband is a first passband, and the center wavelength is a first center wavelength, the optical device further comprising:

a second substrate;

a second plurality of layers provided on the second substrate, the second plurality of layers being configured to transmit first light at a first wavelength, the first wavelength being within said first passband;

a third substrate having a surface;
a third plurality of layers provided on the surface of the third substrate, the third plurality of layers including alternating third and fourth layers, the third layers having a refractive index, $n_{L2}$, and the fourth layers having a refractive index, $n_{H2}$, greater than $n_{L2}$,
wherein the third plurality of layers has a second spectral characteristic, the second spectral characteristic having a second passband, which is defined by passband wavelengths $\lambda_{1\text{-}2passband}$ and $\lambda_{2\text{-}2passband}$, the second spectral characteristic having an average transmissivity at least equal to 80% over the second passband, and the second passband having a second center wavelength between $\lambda_{1\text{-}2passband}$ and $\lambda_{2\text{-}2passband}$,
the second spectral characteristic having an average optical density greater than 4 over at least one of a lower blocking band of wavelengths and an upper blocking band of wavelengths, the lower blocking band of wavelengths extends from wavelength $\lambda_{1\text{-}2block}$, which has an associated optical density equal to 4, to wavelength $\lambda_{2\text{-}2block}$, $\lambda_{2\text{-}2block}$ satisfying:

$\lambda_{2\text{-}2block} < 0.9*((1-x_2)/(1+x_2))*\lambda_{1\text{-}2block}$, wherein the upper blocking band of wavelengths extends from wavelength $\lambda_{3\text{-}2block}$, which has an associated optical density equal to 4, to wavelength $\lambda_{4\text{-}2block}$, $\lambda_{4\text{-}2block}$ satisfying:

$\lambda_{4\text{-}2block} > 1.1*((1+x_2)/(1-x_2))*\lambda_{3\text{-}2block}$, where $$x_2 = \frac{2}{\pi}\arcsin\left(\frac{n_{H2} - n_{L2}}{n_{H2} + n_{L2}}\right),$$

wherein a lower edge band of wavelengths is associated with a lower edge portion of the spectral characteristic adjacent the second passband, the lower edge band of wavelengths extending from $\lambda_{1\text{-}2passband}$ to $\lambda_{1\text{-}2block}$, such that, at wavelength $\lambda_{1\text{-}2\text{-}50\%}$, within the lower edge band of wavelengths, the second coating has a transmissivity of 50%, $\lambda_{1\text{-}2passband}$, $\lambda_{1\text{-}2block}$, and $\lambda_{1\text{-}2\text{-}50\%}$, satisfy:

$(\lambda_{1\text{-}2passband} - \lambda_{1\text{-}2block})/\lambda_{1\text{-}2\text{-}50\%} < 2\%$, wherein an upper edge band of wavelengths is associated with an upper edge portion of the second spectral characteristic adjacent the second passband, the upper edge band of wavelengths extending from $\lambda_{2\text{-}2passband}$ to $\lambda_{3\text{-}2block}$, such that, at wavelength, $\lambda_{2\text{-}2\text{-}50\%}$, within the upper edge band of wavelengths, the second coating has a transmissivity of 50%, $\lambda_{2\text{-}2passband}$, $\lambda_{3\text{-}2block}$, and $\lambda_{2\text{-}2\text{-}50\%}$, satisfy:

$(\lambda_{3\text{-}2block} - \lambda_{2\text{-}2passband})/\lambda_{2\text{-}2\text{-}50\%} < 2\%$, and wherein the first wavelength is within the lower blocking band of wavelengths, the third plurality of layers being configured to pass second light having a second wavelength, the second wavelength being within the second blocking band of wavelengths, the second plurality of layers being configured to reflect third light, the third light having a third wavelength, which is within the second passband, and a minimum spectral distance between $\lambda_{1\text{-}2block}$ and $\lambda_{3\text{-}2block}$ is greater than 2% of the second center wavelength.

12. An optical device in accordance with claim 2, wherein the surface of the substrate is a first surface of the substrate, the substrate being a first substrate further having a second surface, the plurality of layers is a first plurality of layers, the spectral characteristic is a first spectral characteristic, the passband is a first passband, and the center wavelength is a second center wavelength, the optical device further comprising:

a second substrate having a first surface and a second surface;
a second plurality of layers provided between the second surface of the first substrate and a first surface of the second substrate, the second plurality of layers being configured to reflect first light at a first wavelength, the first wavelength being within said passband;
a third plurality of layers provided on the second surface of the second substrate, the third plurality of layers including alternating third and fourth layers, the third layers having a refractive index, $n_{L2}$, and the fourth layers having a refractive index, $n_{H2}$, greater than $n_{L2}$,
wherein the third plurality of layers has a second spectral characteristic, the second spectral characteristic having a second passband, which is defined by passband wavelengths $\lambda_{1\text{-}2passband}$ and $\lambda_{2\text{-}2passband}$, the second spectral characteristic having an average transmissivity at least equal to 80% over the second passband, the second passband has a second center wavelength between $\lambda_{1\text{-}2passband}$ and $\lambda_{2\text{-}2passband}$,
the second spectral characteristic having an average optical density greater than over at least one of a lower blocking band of wavelengths and an upper blocking band of wavelengths, the lower blocking band of wavelengths extends from wavelength, $\lambda_{1\text{-}2block}$, which has an associated optical density equal to 4, to wavelength, $\lambda_{2\text{-}2block}$, $\lambda_{2\text{-}2block}$ satisfying:

$\lambda_{2\text{-}2block} < 0.9*((1-x_2)/(1+x_2))*\lambda_{1\text{-}2block}$, wherein the upper blocking band of wavelengths extends from wavelength $\lambda_{3\text{-}2block}$, which has an associated optical density equal to 4, to wavelength, $\lambda_{4\text{-}2block}$, $\lambda_{4\text{-}2block}$ satisfying:

$\lambda_{4\text{-}2block} > 1.1*((1+x_2)/(1-x_2))*\lambda_{3\text{-}2block}$, where $$x_2 = \frac{2}{\pi}\arcsin\left(\frac{n_{H2} - n_{L2}}{n_{H2} + n_{L2}}\right),$$

wherein a lower edge band of wavelengths is associated with a lower edge portion of the spectral characteristic adjacent the second passband, the lower edge band of wavelengths extending from $\lambda_{1\text{-}2passband}$ to $\lambda_{1\text{-}2block}$, such that, at wavelength $\lambda_{1\text{-}2\text{-}50\%}$, within the lower edge band of wavelengths, the second coating has a transmissivity of 50%, $\lambda_{1\text{-}2passband}$, $\lambda_{1\text{-}2block}$, and $\lambda_{1\text{-}2\text{-}50\%}$, satisfy:

$(\lambda_{1\text{-}2passband} - \lambda_{1\text{-}2block})/\lambda_{1\text{-}2\text{-}50\%} < 2\%$, wherein an upper edge band of wavelengths is associated with an upper edge portion of the second spectral characteristic adjacent the second passband, the upper edge band of wavelengths extending from $\lambda_{2\text{-}2passband}$ to $\lambda_{3\text{-}2block}$, such that, at wavelength, $\lambda_{2\text{-}2\text{-}50\%}$, within the upper edge band of wavelengths, the second coating has a transmissivity of 50%, $\lambda_{2\text{-}2passband}$, $\lambda_{3\text{-}2block}$, and $\lambda_{2\text{-}250\%}$, satisfy:

$(\lambda_{3\text{-}2block} - \lambda_{2\text{-}2passband})/\lambda_{2\text{-}2\text{-}50\%} < 2\%$, and wherein the first wavelength is within the lower blocking band of wavelengths, the third plurality of layers being configured to pass second light having a second wavelength, the second wavelength being within the second blocking band of wavelengths, the second plurality of layers being configured to pass third light, the third light having a third wavelength, which is within the second passband, and a minimum spectral distance between $\lambda_{1\text{-}2block}$ and $\lambda_{3\text{-}2block}$ is greater than 2% of the second center wavelength.

13. An optical device in accordance with claim 12, wherein the second plurality of layers is in contact with the second surface of the first substrate and spaced from the first surface of the second substrate.

14. An optical device in accordance with claim 12, wherein the second plurality of layers is in contact with the first surface of the second substrate and spaced from the second surface of the first substrate.

15. An optical device in accordance with claim 12, wherein the second plurality of layers is in contact with the first surface of the second substrate and with the second surface of the first substrate.

16. An optical device in accordance with claim 12, wherein the optical device includes an adhesive, the second plurality of layers is attached to one of the first surface of the second substrate and the second surface of the first substrate by the adhesive.

17. An optical device in accordance with claim 2, wherein the surface of the substrate is a first surface of the substrate, the substrate being a first substrate further having a second surface, the plurality of layers is a first plurality of layers, the spectral characteristic is a first spectral characteristic, the passband is a first passband, and the center wavelength is a first center wavelength, the optical device further comprising:
a second substrate having a first surface and a second surface;
a second plurality of layers provided between the second surface of the first substrate and a first surface of the second substrate, the second plurality of layers being configured to pass first light at a first wavelength, the first wavelength being within said passband;
a third plurality of layers provided on the second surface of the second substrate, the third plurality of layers including alternating third and fourth layers, the third layers having a refractive index, $n_{L2}$, and the fourth layers having a refractive index, $n_{H2}$, greater than $n_{L2}$,
wherein the third plurality of hard coating layers has a second spectral characteristic, the second spectral characteristic having a second passband, which is defined by passband wavelengths $\lambda_{1\text{-}2passband}$ and $\lambda_{2\text{-}2passband}$, the second spectral characteristic having an average transmissivity at least equal to 80% over the second passband, the second spectral characteristic having an average optical density greater than 4 over at least one of a lower blocking band of wavelengths and an upper blocking band of wavelengths, the lower blocking band of wavelengths extends from wavelength, $\lambda_{1\text{-}2block}$, which has an optical density equal to 4, to wavelength, $\lambda_{2\text{-}2block}$, $\lambda_{2\text{-}2block}$ satisfying:

$\lambda_{2\text{-}2block} < 0.9*((1-x_2)/(1+x_2))*\lambda_{1\text{-}2block}$, wherein the upper blocking band of wavelengths extends from wavelength $\lambda_{3\text{-}2block}$, which has an associated optical density equal to 4, to wavelength, $\lambda_{4\text{-}2block}$, $\lambda_{4\text{-}2block}$ satisfying:

$\lambda_{4\text{-}2block} > 1.1*((1+x_2)/(1-x_2))*\lambda_{3\text{-}2block}$, where $$x_2 = \frac{2}{\pi}\arcsin\left(\frac{n_{H2}-n_{L2}}{n_{H2}+n_{L2}}\right),$$

wherein a lower edge band of wavelengths is associated with a lower edge portion of the spectral characteristic adjacent the second passband, the lower edge band of wavelengths extending from $\lambda_{1\text{-}2passband}$ to $\lambda_{1\text{-}2block}$, such that, at wavelength $\lambda_{1\text{-}2\text{-}50\%}$, within the lower edge band of wavelengths, the second coating has a transmissivity of 50%, $\lambda_{1\text{-}2passband}$, $\lambda_{1\text{-}2block}$, and $\lambda_{1\text{-}2\text{-}50\%}$, satisfy:

$(\lambda_{1\text{-}2passband} - \lambda_{1\text{-}2block})/\lambda_{1\text{-}2\text{-}50\%} < 2\%$, wherein an upper edge band of wavelengths is associated with an upper edge portion of the second spectral characteristic adjacent the second passband, the upper edge band of wavelengths extending from $\lambda_{2\text{-}2passband}$ to $\lambda_{3\text{-}2block}$, such that, at wavelength, $\lambda_{2\text{-}2\text{-}50\%}$, within the upper edge band of wavelengths, the second coating has a transmissivity of 50%, $\lambda_{2\text{-}2passband}$, $\lambda_{3\text{-}2block}$, and $\lambda_{2\text{-}250\%}$, satisfy:

$(\lambda_{3\text{-}2block} - \lambda_{2\text{-}2passband})/\lambda_{2\text{-}2\text{-}50\%} < 2\%$, and wherein the first wavelength is within the lower blocking band of wavelengths, the third plurality of layers being configured to pass second light having a second wavelength, the second wavelength being within the second blocking band of wavelengths, the second plurality of layers being configured to reflect third light, the third light having a third wavelength, which is within the second passband, and a minimum spectral distance between $\lambda_{1\text{-}2block}$ and $\lambda_{3\text{-}2block}$ is greater than 2% of the second center wavelength.

18. An optical device in accordance with claim 17, wherein the second plurality of layers is in contact with the first surface of the first substrate and spaced from the first surface of the second substrate.

19. An optical device in accordance with claim 17, wherein the second plurality of layers is in contact with the first surface of the second substrate and spaced from the first surface of the first substrate.

20. An optical device in accordance with claim 17, wherein the second plurality of layers is in contact with the first surface of the second substrate and with the first surface of the first substrate.

21. An optical device in accordance with claim 17, wherein optical device includes an adhesive, the second plurality of layers is attached to one of the first surface of the second substrate and the first surface of the first substrate by the adhesive.

22. An optical device in accordance with claim 17, wherein the first substrate includes a first right angle prism and the second substrate includes a second right angle prism, the first and second right angle prisms being oriented relative to one another to constitute a substantially cubical structure.

23. A fluorescence spectroscopy system, comprising:
a source configured to supply light;
an optical filter configured to transmit said light, such that said light is directed toward a sample, the optical filter including:
a substrate having a surface; and
a plurality of layers provided on the surface of the substrate, the plurality of hard-coating layers including alternating first and second layers, the first layers having a first refractive index, $n_L$, and the second layers having a second refractive index, $n_H$, greater than the first refractive index,
wherein the plurality of hard-coating layers has a spectral characteristic, the spectral characteristic having a passband, said light having a wavelength within the passband, the passband being defined by a first passband wavelength $\lambda_{1passband}$ and a second passband wavelength $\lambda_{2passband}$, the spectral characteristic having an average transmissivity at least equal to 80% over the passband and the passband having a center wavelength between $\lambda_{1passband}$ and $\lambda_{2passband}$,
the spectral characteristic having an average optical density greater than 4 over at least one of first and second blocking bands of wavelengths, wherein the first blocking band of wavelengths extends from a first blocking wavelength, $\lambda_{1block}$, having an associated optical density equal to 4 to a second blocking wavelength, $\lambda_{2block}$, the second blocking wavelength satisfying:

$\lambda_{2block} < 0.9*((1-x)/(1+x))*\lambda_{1block}$, wherein the second blocking band of wavelengths extends from a third blocking wavelength, $\lambda_{3block}$, having an associated optical density equal to 4 to a fourth blocking wavelength, $\lambda_{4block}$, the fourth blocking wavelength satisfying:

$\lambda_{4block} > 1.1*((1+x)/(1-x))*\lambda_{3block}$, where $$x = \frac{2}{\pi}\arcsin\left(\frac{n_H - n_L}{n_H + n_L}\right),$$

wherein a first edge band of wavelengths is associated with a first edge portion of the spectral characteristic adjacent the passband, the first edge band of wavelengths extending from $\lambda_{1passband}$ to $\lambda_{1block}$, such that, at a first transmission wavelength, $\lambda_{1-50\%}$, within the first edge band of wavelengths, the coating has a transmissivity of 50%, $\lambda_{1passband}$, $\lambda_{1block}$, and $\lambda_{1-50\%}$, satisfy:

$(\lambda_{1passband} - \lambda_{1block})/\lambda_{1-50\%} < 2\%$, and wherein a second edge band of wavelengths is associated with a second edge portion of the spectral characteristic adjacent the passband, the second edge band of wavelengths extending from $\lambda_{2passband}$ to $\lambda_{3block}$, such that, at a second transmission wavelength, $\lambda_{2-50\%}$, within the second edge band of wavelengths, the plurality of layers has a transmissivity of 50%, $\lambda_{2passband}$, $\lambda_{3block}$, and $\lambda_{2-50\%}$, satisfy:

$(\lambda_{3block} - \lambda_{2passband})/\lambda_{2-50\%} < 2\%$, and a minimum spectral distance between $\lambda_{1block}$ and $\lambda_{3block}$ is greater than 2% of the center wavelength; and
a detector configured to sense emitted light from the sample in response to said light supplied by the source.

24. A fluorescence spectroscopy system, comprising:
a source configured to supply first light, said first light being directed toward a sample such that the sample emits second light;
an optical filter configured to transmit said second light, the optical filter including:
a substrate having a surface; and
a plurality of layers provided on the surface of the substrate, the plurality of hard-coating layers including alternating first and second layers, the first layers having a first refractive index, $n_L$, and the second layers having a second refractive index, $n_H$, greater than the first refractive index,
wherein the plurality of hard-coating layers has a spectral characteristic, the spectral characteristic having a passband, the second light having a wavelength within the passband, the passband being defined by a first passband wavelength $\lambda_{1passband}$ and a second passband wavelength $\lambda_{2passband}$, the spectral characteristic having an average transmissivity at least equal to 80% over the passband, and the passband having a center wavelength between $\lambda_{1passband}$ and $\lambda_{2passband}$,
the spectral characteristic having an average optical density greater than 4 over at least one of first and second blocking bands of wavelengths, wherein the first blocking band of wavelengths extends from a first blocking wavelength, $\lambda_{1block}$, having an associated optical density equal to 4 to a second blocking wavelength, $\lambda_{2block}$, the second blocking wavelength satisfying:

$\lambda_{2block} < 0.9*((1-x)/(1+x))*\lambda_{1block}$, wherein the second blocking band of wavelengths extends from a third blocking wavelength, $\lambda_{3block}$, having an associated optical density equal to 4 to a fourth blocking wavelength, $\lambda_{4block}$, the fourth blocking wavelength satisfying:

$\lambda_{4block} > 1.1*((1+x)/(1-x))*\lambda_{3block}$, where $$x = \frac{2}{\pi}\arcsin\left(\frac{n_H - n_L}{n_H + n_L}\right),$$

wherein a first edge band of wavelengths is associated with a first edge portion of the spectral characteristic adjacent the passband, the first edge band of wavelengths extending from $\lambda_{1passband}$ to $\lambda_{1block}$, such that, at a first transmission wavelength, $\lambda_{1-50\%}$, within the first edge band of wavelengths, the coating has a transmissivity of 50%, $\lambda_{1passband}$, $\lambda_{1block}$, and $\lambda_{1-50\%}$, satisfy:

$(\lambda_{1passband} - \lambda_{1block})/\lambda_{1-50\%} < 2\%$, and wherein a second edge band of wavelengths is associated with a second edge portion of the spectral characteristic adjacent the passband, the second edge band of wavelengths extending from $\lambda_{2passband}$ to $\lambda_{3block}$, such that, at a second transmission wavelength, $\lambda_{2\text{-}50\%}$, within the second edge band of wavelengths, the plurality of layers has a transmissivity of 50%, $\lambda_{2passband}$, $\lambda_{3block}$, and $\lambda_{2\text{-}50\%}$, satisfy:

$$(\lambda_{3block}-\lambda_{2passband})/\lambda_{2\text{-}50\%} < 2\%, \text{ and}$$

a minimum spectral distance between $\lambda_{1block}$ and $\lambda_{3block}$ is greater than 2% of the center wavelength; and a detector configured to sense the second light.

* * * * *